United States Patent [19]

Chadima, Jr. et al.

[11] Patent Number: 4,604,693
[45] Date of Patent: Aug. 5, 1986

[54] SYSTEM AND METHOD FOR COMMUNICATION BETWEEN NODES OF A CLOSED LOOP LOCAL COMMUNICATION PATH

[75] Inventors: George E. Chadima, Jr.; Joseph J. Kubler, both of Cedar Rapids, Iowa

[73] Assignee: Norand Corporation, Cedar Rapids, Iowa

[21] Appl. No.: 544,969

[22] Filed: Oct. 24, 1983

Related U.S. Application Data

[62] Division of Ser. No. 289,098, Jul. 31, 1981, Pat. No. 4,430,700.

[51] Int. Cl.⁴ ............................................. G06F 13/38
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,007,441 | 2/1977 | Faber | 364/900 |
| 4,007,450 | 2/1977 | Haibt et al. | 364/200 |
| 4,176,401 | 11/1979 | Linberger | 364/900 |
| 4,195,351 | 3/1980 | Barner et al. | 364/900 |
| 4,224,684 | 9/1980 | Conner et al. | 364/900 |
| 4,227,178 | 10/1980 | Gergaud et al. | 364/900 |
| 4,334,305 | 6/1982 | Girardi | 364/200 |
| 4,363,093 | 12/1982 | Davis et al. | 364/200 |
| 4,432,054 | 2/1984 | Okada et al. | 364/200 |

OTHER PUBLICATIONS

*Proc. of the Berkeley Conf. on Distrib. Data Management and Computer Networks,* 4th, Univ. of Calif., Aug. 28-30, 1979, pp. 309-321, Blauman, Sheldon, "Labeled Slot Multiplexing: A Technique for a High Speed, Fiber Optic Based, Loop Network".
*Proceedings of Distributed Computing,* Compcon 80, 21st IEEE Computer Society International, 1980, pp. 507-515, Wilson, T. C. & Silio, C. B., "Distributed Control of Ring Networks Using a 'Play-Through' Protocol".
*Proceedings of Distributed Computing,* Compcon 80, 21st IEEE Computer Society International, 1980, pp. 159-165, Ikeda et al, "Computer Network Coupled by 100 MBPS Optical Fiber Ring Bus-System Planning and Ring Bus Subsystem Description".
*Computer Network* 4, 1980, pp. 239-244, Saltzer, J. H. & Pogran, K. T., "A Star-Shaped Ring Network with High Maintainability".
*IEEE Transactions on Communications,* vol. COM-27, No. 4, Apr. 1979, pp. 760-761, Hopper, A. & Wheeler, D. J., "Maintenance of Ring Communication Systems".
*Proc. of the Workshop on Interconnect Networks for Parallel and Distributed Processing,* Purdue Univ., Apr. 21-22, 1980, published by IEEE (Catalog N 80CH1560-2), pp. 93-100, Arden, B. W. & Lee, H., "Analysis of Chordal Ring Network".
2nd Proc., Compsac '78: IEEE Computer Soc. Int. Computer Software & Applications Conference, Chicago, Ill., published by IEEE (Catalog N 78CH1338-3C), 1978, pp. 674-679.
Agrawala et al, "The Slotted Ring v. the Token-Controlled Ring": *Electronics,* Aug. 28, 1980, p. 80, Chips, Twisted Pair Build Simple Local Net.
Bantz, D. F., "Decentralized Request Resolution Mechanisms", IBM Tech. Disclosure Bull., vol. 20, Jul. 1977, pp. 853-855.

*Primary Examiner*—Thomas M. Heckler
*Attorney, Agent, or Firm*—Hill, Van Santen, Steadman & Simpson

[57] ABSTRACT

In an exemplary embodiment a transmission link switch is provided at each node. In a transmission mode, the switch provides a transmission path which transmits incoming messages directly to the node output without any processing delay. In the cutoff mode of the switch, the associated data processor still receives messages from the node input, but the direct path from the node input to node output is interrupted. During the sending of messages and responses thereto, the link switches at the sending and responding nodes are operated so as to prevent the messages from making multiple traverses of the loop communications path while also avoiding the occurrence at other nodes of a communications gap which would permit such nodes to interfere with the exchange of messages. The arrangement is such that each node can be implemented with low cost integrated circuit modules. No common timing link is required between the nodes. Transmission of requests for control of communication and the actual transmission of desired information between the nodes all take place via a single channel of the loop communications path.

11 Claims, 4 Drawing Figures

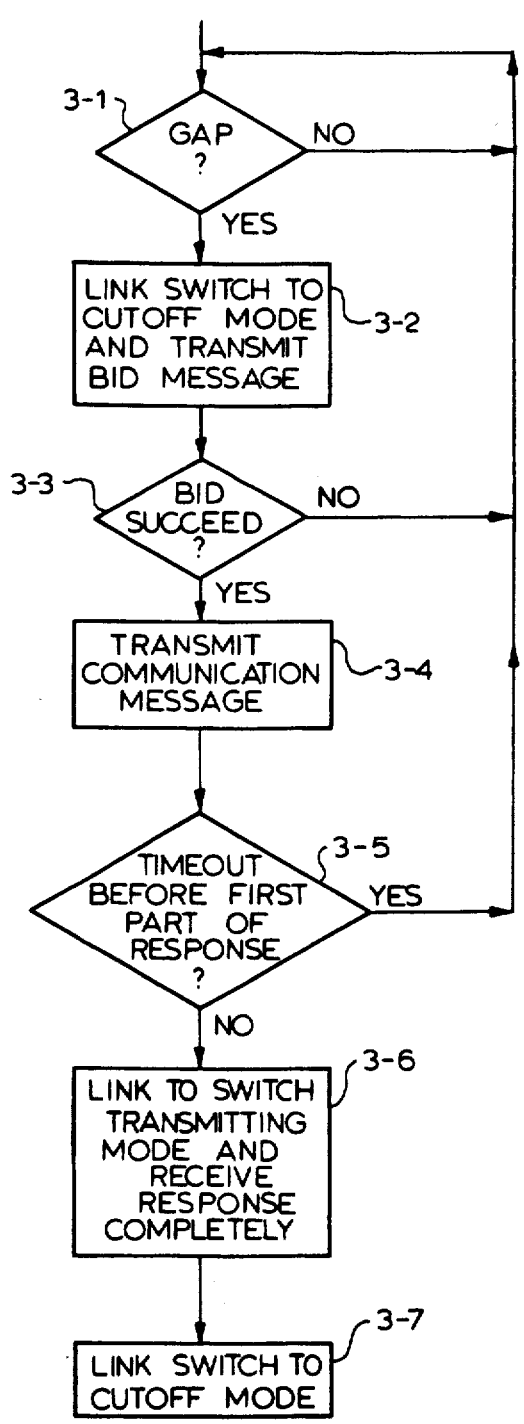
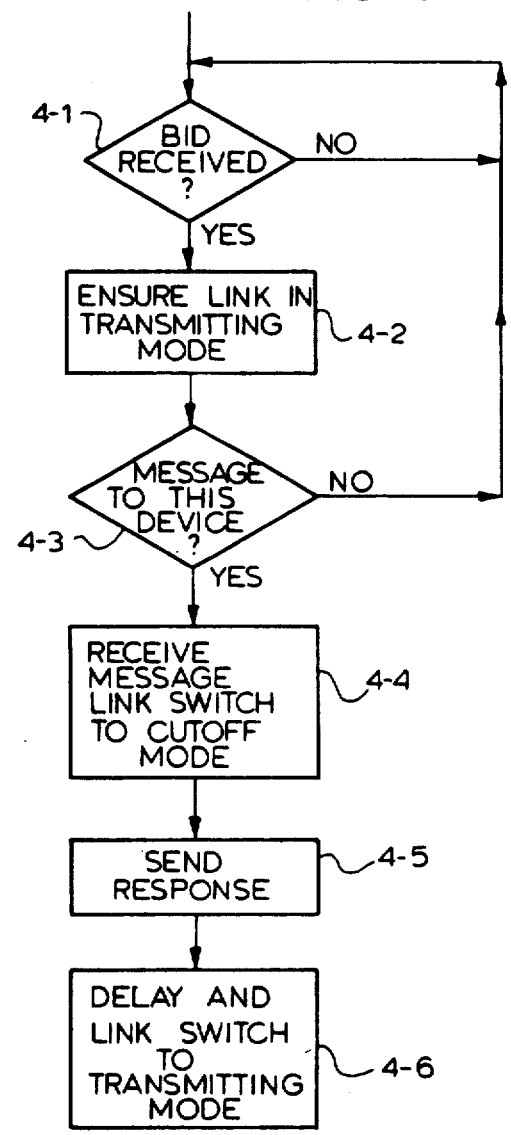

SYSTEM AND METHOD FOR COMMUNICATION BETWEEN NODES OF A CLOSED LOOP LOCAL COMMUNICATION PATH

CROSS-REFERENCE TO RELATED APPLICATION

The present application is a divisional application based on my prior application Ser. No. 289,098 filed July 31, 1981, now U.S. Pat. No. 4,430,700 issued Feb. 7, 1984.

BACKGROUND OF THE INVENTION

The present invention relates to a system and method for communication between nodes of a closed loop local communication path.

Many efforts have been made to develop a ring type communications network because of the potential low cost and particularly because such a system can be implemented using fiber optic paths. Fiber optic data transmission is particularly attractive for a local communication system because of its immunity to electromagnetically induced noise.

The general objective of a ring distribution of processors is recognized, for example, in the text *Computer Networks and Distributed Processing*, by James Martin, Prentice-Hall, Inc., 1981, page 38, FIG. 3.2, the second illustration.

One of the traditional objections to such a ring type processing network relates to such a system wherein a central controller is required with a store and forward function with respect to each of the other nodes. In such a system, communication is dependent on the speed of operation of the central controller, and is less flexible because of the requirements that the central controller poll the recipient node prior to actual forwarding of the data. It would be desirable to avoid the use of a central controller not only for greater speed and flexibility of communication between the nodes of a closed loop communication path, but also to provide such a communication system where failure of a computer at one node would not prevent continued operation, as is the case where a central controller is present.

Other types of ring networks essentially involve a ring of data processing devices each of which must check an incoming message before forwarding it to the next node. In many check and forward systems communication is structured in relation to specified multiplex time slots or in relation to a circulating control message e.g. a so called token or "GO" control signal. In any event, complexity and added expense result from the necessity for recognizing the destination address of an incoming message within a processing cycle of brief time duration, and for selectively removing a message packet from the loop where the same originated at the local node and has traversed the loop. In one such proposed check and forward system, information was to be sent in individual packets eighteen bits in length including a total destination label size of eight bits, a data field of eight bits and start/stop bits.

SUMMARY OF THE INVENTION

Accordingly, an important object of the present invention is to provide a closed loop communication system including a series of nodes each of which may communicate with the others on a flexible basis without the requirement of a permanent network controller and without the use of the check and forward principle and without requiring a separate request resolution path or a common timing line for such path.

In accordance with an important feature of the invention, a particular method for effecting communication in such a closed loop communication path has been developed wherein data messages are propagated about the loop path without processing delays at the respective nodes and without restriction on the length of a given data message.

A further object of the invention is to provide a closed loop communication system and method which is extremely simple and economical and highly flexible in its adaptability to the needs of relatively small enterprises, for example individual restaurants, and which system can very readily be expanded as needed with minimal cost and downtime.

In accordance with a method aspect of the present invention the nodes of a closed loop communication path initiate communication with other nodes by monitoring the closed loop communication path for a gap in communication along the closed loop communication path of a defined time span. Upon detection of such a communication gap, a node desiring to initiate communication, termed a bidding node, interrupts the loop by means of a transmission link switch at the bidding node, and transmits a bid message about the loop. The nonbidding nodes upon receipt of the bid message respond by insuring that their transmission link switches are closed. The bidding node monitors the closed loop communication path for the bid message (which will tranverse the loop and arrive at the bidding node if the transmission link switches of the other nodes along the loop are in the closed condition). Upon a successful bid at a bidding node, a data message may be transmitted via the closed loop communication path while the transmission link switch at the bidding node is in the loop interrupting condition. At a recipient node upon receipt of the data message, the transmission link switch is placed in the loop interrupting mode, and a response is transmitted via the closed loop communication path. At the bidding node the transmission link switch is switched to the closed transmission condition to assure against a communication gap and then is placed in the loop interrupting mode. With such a method, decentralized control can be effected without requiring a common timing reference for the nodes of a closed loop communication path.

In accordance with an aspect of the apparatus invention, a series of nodes of a closed loop data processing network have communication links for enabling data communication about the loop path which is undelayed rather than requiring a processing step at each node. Means is associated with each data processing unit for placing an associated transmission link switch in a loop interrupting or cutoff mode during transmission of a data message from the data processing unit. Said means controls the transmission link switch to avoid introducing a communications gap of a predetermined time duration during reception of a response to the transmitted data message. In this way the response can circulate about the closed loop and prevent an undesired communications gap from being perceived at other nodes which may desire to transmit messages. This feature makes possible a decentralized closed loop communications network for data communication wherein the data processing units at the nodes operate autonomously without requiring a supervisory control such as a common timing reference.

A highly significant concept leading to successful operation of a closed loop data communication system as described herein was that of a control system embedded at the respective decentralized nodes such that one of the transmission link switches about the loop is maintained in cutoff mode at all times to insure that data messages do not repeatedly tranverse the loop communications path. In a specific implementation of this concept, a bidding node seeking to initiate a data message and a recipient node transmitting a response coordinate the condition of their transmission link switches such that the bidding node prevents repeated circulation of a bid message or a data message originating therefrom while a recipient node prevents repeated circulation of its response message.

Other objects, features and advantages will be apparent from this detailed disclosure and from the appended claims.

BRIEF DESCRIPTION OF THE DRAWINGS

FIGS. 3 and 4 comprise flow diagrams for explaining the system and method in accordance with the present invention.

DETAILED DESCRIPTION

Figure 1:
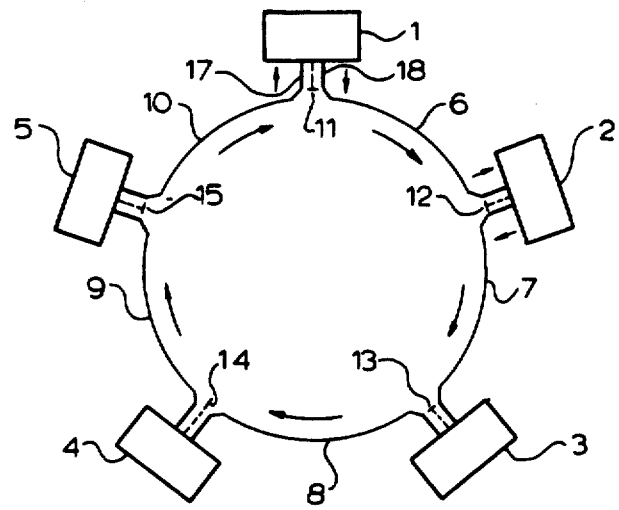
FIG. 1 is a diagrammatic view illustrating a ring type local computer network implemented in accordance with the system and method of the present invention.

FIG. 1 illustrates a ring type computer network comprising a series of nodes or stations 1 through 5. A loop communication path is provided by successive transmission links 6 through 10 and successive transmission link switches 11 through 15. The switches 11 through 15, in the illustrated embodiment, have a first mode wherein the associated incoming and outgoing transmission links are directly connected for the transmission of data without appreciable time delay, and have a second mode (indicated diagrammatically for switch 14) wherein the transmission link switch prevents a direct transmission of signal pulses from the incoming transmission link to the outgoing transmission link.

Each transmission link switch in FIG. 1 is diagrammatically indicated as having an incoming signal branching means for directing incoming signal pulses both to the transmission link switch path and also to an incoming signal receiving path such as 17. Similarly an outgoing signal junction is indicated for transmitting signal pulses to the outgoing transmission link either from the transmission link switch (when the transmission link switch is in its first transmitting mode) or from an outgoing signal sending path 18.

Considering a given station such as that at 1 in FIG. 1, if one of the other nodes (e.g. node 4) transmits a signal pulse, the pulse travels along the loop communication path via transmission links such as 9 and 10. If the transmission link switch 11 at node 1 is in the first transmitting mode, the signal pulse will be directly coupled to the outgoing transmission link 6 and for example may be again received at the sending node (e.g. node 4) after a time interval essentially dependent on the transmission velocity of the transmission links 6 through 10 and of the switches 11 through 15. As illustrated in FIG. 1, a sending node such as node 4 is to have its transmission link switch 14 in the second nontransmitting mode, so that the signal pulse traverses the loop path only once.

In a system in accordance with the present invention, each node may be provided with pulse amplification. Such pulse amplification may be provided at each transmission link switch path. Where the transmission links such as 6 through 10 are implemented as fiber optic transmission lines, it is convenient in the present state of the art to convert incoming light pulses into electronic form for amplification. In this case the transmission link switches such as 11 through 15 may be in the form of electronic switches interposed in series with electronic pulse amplification circuitry.

Figure 2:
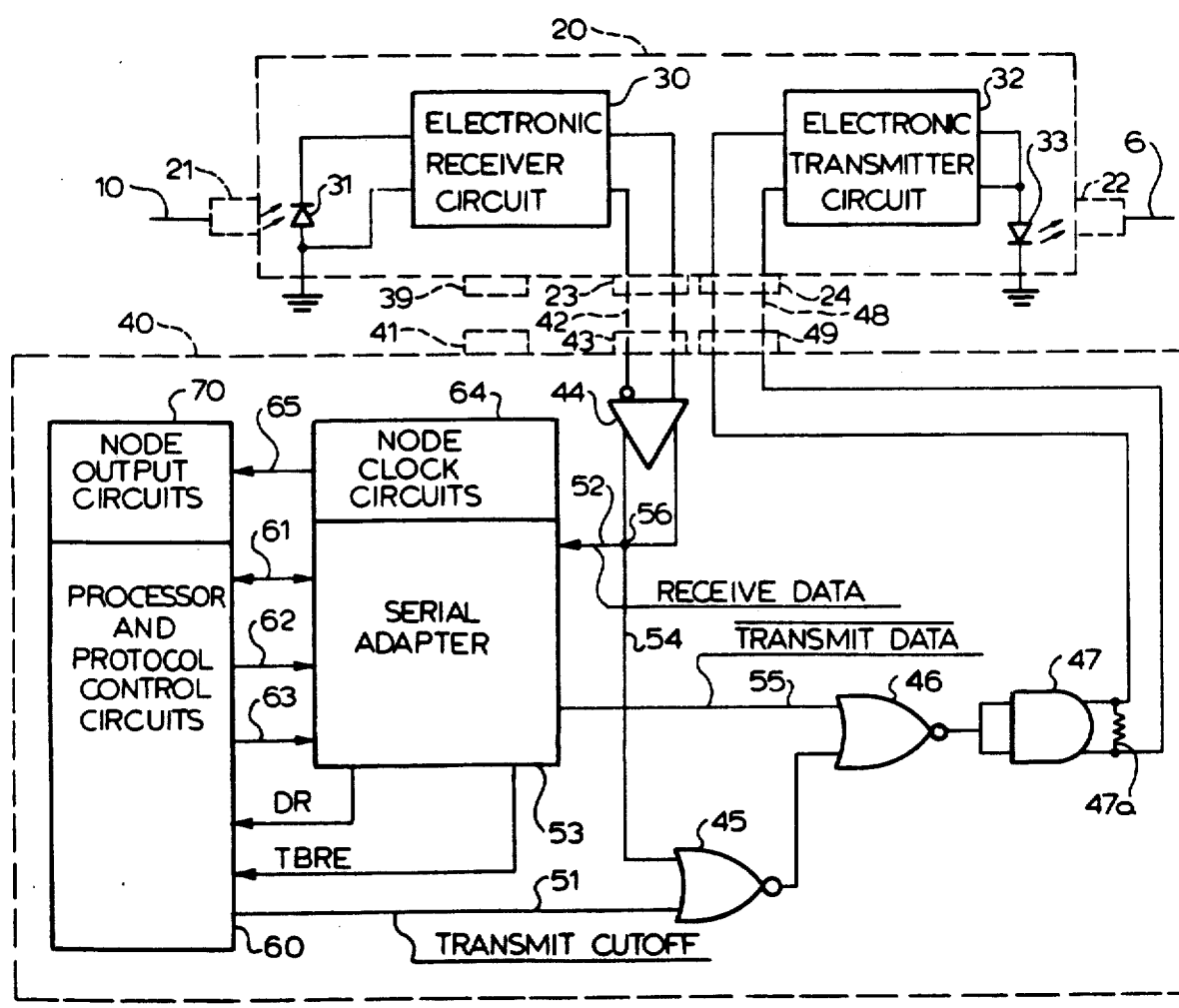
FIG. 2 is an electric circuit diagram illustrating a specific implementation of a transmission link switch for the nodes of a ring type computer network such as shown in FIG. 1 and indicating pulse amplification inserted in series with the transmission link switch, and node circuits for receiving and transmitting data and for controlling the transmission link switch.

For such a system it is advantageous to provide a standardized fiber optic interface module such as indicated at 20, FIG. 2, having a standard fitting 21 for receiving an incoming fiber optic transmission line and having a standard fitting 22 for connection with an outgoing fiber optic transmission line. Further standard electric cable fittings are indicated at 23 and 24 for providing an electric signal output and an electric signal input for the fiber optic interface module. The interface 20 may comprise an electronic receiver circuit 30 associated with an optical detector 31 and an electronic transmitter circuit 32 for driving an optical emitter 33.

The electronic receiver circuit 30 may be of a standardized design suitable for driving any of the various types of node circuitry such as indicated at 40. Further, the circuits 30 and 32 together may provide an optimum degree of amplification such that when cable fittings 23 and 24 are directly connected by means of a jumper cable, interface module 20 may serve as a simple repeater. In the event that module 20 does not include its own power supply, a further connector means may be provided as indicated at 39 which may be coupled to cooperating means 41 of node circuitry 40 so that power may be supplied to the interface module 20 from node circuitry 40. If node circuitry 40 is to be disconnected from module 20, e.g. because of a malfunction, a separate power supply module (not shown) may be connected at 39 to provide for operation of the interface module 20 independently of the node circuitry 40.

In general, a ring network such as shown in FIG. 1 may have fiber optic links such as 6 through 10 of a maximum length compatible with the amplification provided by components 30 and 32 of a standard interface module such as 20. Thus if node circuits 1 through 5, FIG. 1, comprise actual working computer circuits such as microprocessor units, electronic display units (e.g. cathode ray tube displays), keyboards, printers, and the like), the fiber optic links may each consist of a single continuous fiber optic strand without any amplification. A passive jumper cable between fittings 23 and 24 would then be used only to bypass the working node circuitry such as 40 in the event of a malfunction or the like.

A basic aspect of the system of FIG. 1 resides in the provision of a decentralized network where in principle any of the working node circuits 1 through 5 may be bypassed (e.g. at 23, 24, FIG. 2) without detriment to communication among the remaining nodes. Furthermore the transmission of data via an interface module is not subject to a processing (clock cycle) delay when the associated transmission link switch is in its first transmission mode (or is bypassed because of a malfunction). In particular, where electronic node circuitry, such as 40, FIG. 2, requires a given clock cycle time for executing a processing step, the signals being sent along the loop circuit such as shown in FIG. 1 traverse the node circuitry at an electronic transmission speed which is independent of the duration of such a clock cycle or processing interval and is dependent only on the actual response times of the circuits disposed in the transmission link switch path. Referring to FIG. 2, the switch path may include optical detector 31, receiver circuit 30, a cable 42 between fittings 23 and 43, pulse amplifier 44, NOR circuits 45, 46, pulse amplifier 47, a cable 48 between fittings 49 and 24, transmitter circuit 32 and optical emitter 33. In the particular exemplary embodiment of FIG. 2, which is based on commercially available components at the time of development, each of the transmission link switches such as 11 through 15 in FIG. 1 is implemented by means of a TTL (transistor transistor logic) integrated circuit module, and in particular by the NOR gate 45. An input line 51 of gate 45 is held at a logical zero potential to maintain switch 45 in its first pulse transmitting mode. To shift the switch 45 to its second nontransmitting mode, line 51 is shifted to a logical one "Transmit Cutoff" condition.

In FIG. 2, an electronic branching point 56 is provided at the output of electronic amplifier 44 so that incoming signal pulses can be supplied via a line 52 to a serial adapter component 53 as well as being supplied to the transmission link switch 45 via its second input 54.

When the node circuitry 40 has placed switch 45 in its second transmission cutoff mode, the serial adapter component 53 may effect a data transmission along the loop transmission path (FIG. 1) by supplying electronic pulses to an input line 55 of the NOR gate 46. Gate 46 thus provides a junction for coupling locally generated signal pulses onto the outgoing path leading from the transmission link switch (NOR gate 45) to the outgoing transmission link. Thus the incoming signal branching means which is indicated diagrammatically in FIG. 1 may be comprised of an electronic junction point as indicated at 56, FIG. 2. The "Receive Data" path 52 in FIG. 2 corresponds with the incoming signal branch path 17 indicated in FIG. 1. Similarly the "Transmit Data" line 55 in FIG. 2 corresponds to the outgoing signal sending path 18 indicated in FIG. 1.

For the particular node circuitry shown in FIG. 2, data is received as a time sequence of pulses on a single input channel 52. The pulses may represent successive hexadecimal characters and may be accumulated in a serial to parallel input register of component 53. For example, a given station of FIG. 1 may transmit a two character bid code followed by an address code representing the transmitting or bidding station or device. If the input register of component 53, FIG. 2, has received such a two character bid code, it can be transferred in parallel to a component 60 for processing, via a multiconductor data path indicated at 61. Such a transfer can be initiated by applying a momentary logical one signal to a read line 62. Similarly data from component 60 to be transmitted may be transferred in parallel via data path 61 to an output register of component 53 in response to a momentary logical one signal to a write line 63. Such data can then be output serially at a clock rate of an associated clock circuit 64 via transmit data line 55. Line 65 may connect a clock rate signal and the inverse of the clock rate signal with components 60 and 70. Component 70 may be a printer control circuit, for example. Data may be transmitted from component 60 to component 70 via a multiconductor path (not shown) and logical control signals may be supplied from component 60 to component 70 for effecting a desired output operation, with suitable acknowledgement and status signals being supplied from component 70 to component 60 in a conventional manner.

Component 60 may be implemented, for example, as a type 8748 intergrated circuit, commercial sources for this microcomputer with erasable programmable read only memory being given in IC MASTER for 1981, page 555, lines 100 et seq.

A further understanding of the system of FIGS. 1 and 2 and its operation may be had by reference to the flow diagrams of FIGS. 3 and 4. Reference numerals referring to these figures have an initial number corresponding to the figure number followed by a hyphen and a further digit or digits.

FIG. 3 is a simplified flow diagram for explaining operation at a node where a device is ready to transmit a data message. Such a node may have circuitry as shown in FIG. 2. FIG. 2 will be referred to in describing both sending and receiving nodes since it will be apparent when similar parts of two different nodes are intended. The sending node monitors its serial adapter 53 for the presence of data on the loop communication path. For example, component 60 may respond to each "Data Ready" signal supplied via line DR. In this case, the absence of a logical one signal at line DR for a predetermined time interval would indicate the existence of a communications gap. For example if the input register has eight stages, and if data is supplied to the input register at 125 kilobits per second, a data ready signal could occur after 64 microseconds. For the case of a printer station ready to transmit data, the microprocessor of component 60 can simply check for a Data Ready logical one condition on line DR at intervals of ten microseconds. The program can be such that if the Data Ready line DR remains at a logical zero condition during each of about ninety-eight monitor intervals, corresponding to a communications gap of about one millisecond, an affirmative decision is reached at the decision block 3-1. Decision block 3-1 can be implemented as a register which is initially set to a count value of ninety-eight and which is decremented each time the Data Ready line is found to be at the logical zero level and inspected for a zero count value representing the affirmative decision. If the Data Ready line DR is found to be at a logical one level, the register is reset to ninety-eight and a negative decision is reached as represented by the return path leading from the right hand corner of block 3-1.

Where the communications gap is detected, the microcomputer of component 60 proceeds as represented by step 3-2. In this event, a logical one is placed on the associated Transmit Cutoff line 51 to shift the transmission link switch 45 to its second transmission cutoff mode. At this point, having opened the direct loop path of FIG. 1, e.g. at transmission link switch 14, the microprocessor of component 60 checks for another communications gap of about one millisecond (e.g. a count of ninety) as an allowance for mistiming. If this second gap is also found to be present, then a bid message is loaded into an output register of the serial adapter 53 and transmitted to the Transmit Data line 55 at the transmission rate desired for the loop communication path of FIG. 1. The bid message may include a first two hexadecimal characters, e.g. 55 (hexadecimal), followed by two hexadecimal characters representing the address of the bidding (originating) station (e.g. a number between one hundred and twenty-eight and two hundred and fifty-five). Where data channel 61 and/or the output register of component 53 has a capacity less than that required for a given message length, it will be understood that suitable portions (e.g. successive eight bit bytes) of the complete message may be transferred via an output buffer register to the output register in successive operating cycles. Thus if eight bits at a time are loaded via path 61, a first eight bits may be transmitted in a burst with a duration of sixty-four microseconds after which a second eight bit portion of the message is loaded into the output register and sent. Alternatively, the component 60 may be operated at a higher clock rate, e.g. six megahertz, and may load a complete message into a sixteen bit output register, eight bits at a time, whereupon the complete sixteen bit message is sent over a desired transmission interval.

For a specific serial adapter 53 (e.g. a type IM 6402-1 Universal Asynchronous Receiver-Transmitter), each eight bit byte of data may be sent as part of a character group comprising: one start bit, eight data bits, one parity bit and one stop bit, a total of eleven bits. With the system and method herein disclosed, a message may be of any desired length. For example with an eight-bit HASH character representing the sum of bytes starting with a one-byte local address, and a one-byte status, the data part of the message could contain over 250 bytes.

Once the bid message has been transmitted, the bidding station monitors its serial adapter 53 to determine if its bid message has completely traversed the loop communication path. If this is the case, the bid message will be received at the input register of the serial adapter 53 of the bidding station (e.g. node 4) signifying a successful bid as represented by block 3—3, FIG. 3. For the case where two hexadecimal characters at a time are transferred via the data link 61 from an input buffer register associated with the input register of serial adapter 53, the program may provide that upon receipt of the characters 55 (hexadecimal), the program awaits arrival of the next two characters and compares the received address with the address of the bidding station. If the address is equal to that of the bidding station, the program proceeds to block 3-4 as represented in FIG. 3. It will be understood that block 3-4 is executed without allowing the occurrence of a communications gap (of about one millisecond) at any of the other nodes, and that the other nodes are so programmed that the node link transmission switches will all remain in the first transmitting mode in the absence of the necessary communications gap. It will be understood that each block of data as transmitted will be received at each of the other nodes and should also traverse the loop and arrive at the input register of the sending station.

A response to the message sent by the successful bidder (e.g. node 4) is required. If this is an initial transmission from the bidder, then the response can be data (e.g. to be printed). It can also be a Message Accepted signal (ACK), Message in Error, Retry (NAK), Message Accepted and Acted Upon (DEND), or Message Cannot Be Accepted by Addressed Device At This Time (BUSY). As indicated at block 3-5, the bidder waits for a response for a suitable time interval, e.g. about one millisecond. If the first part of a response is received before the interval elapses, then the transmission link switch at the bidding station (e.g. switch 14, FIG. 1) is placed in its first transmitting mode as represented by block 3-6. This prevents a communication gap from being observed at stations beyond the original bidding station, e.g. stations no. 5 and no. 1, if station no. 2 was being addressed and is responding. The original bidding station can now receive and process any remaining part of the response (e.g. from station no. 2).

The original bidding station must again shift its transmission link switch (e.g. 14) to the second transmission cutoff mode as represented by block 3-7.

FIG. 4 indicates in a simplified flow diagram the operation of a receiving station in responding to the transmission of a communications message (sent as outlined in FIG. 3). When a receiving station receives a bid message, the first part of the message is symbolized as CLOSEL (close link) and is the number 55 (hexadecimal). The second part of the message is the address of the bidding node. When a bid is recognized as represented by block 4-1, the first step at the receiving station is to ensure that the transmission link switch (e.g. switch 12 of node no. 2) is in the first transmitting mode as shown by step 4-2.

The message transmitted by the bidding station may have the following component parts: a Start Character, (STCHR, e.g. 5E, hexadecimal); an Address of the Device to Receive Data, (TOADDR). the bidding device address, (ADDR); a Command (COM) to the Device Receiving the Message or the Status (STATUS) of the Bidding Device Which is Responding to a Command; Optional Data Intended for the Receiving Device (DATA); a Longitudinal Redundancy Check (LRC); and a Byte Sum of All Bytes Starting with ADDR through DATA, (HASH).

The message may include the TOADDR part twice so that if there is a discrepancy between the two receiving values for TOADDR, the message is ignored.

The receiving nodes each compare the TOADDR value with the address assigned to its device. If the received message is addressed to its device, as determined at block 4-3, then the DATA, LRC and HASH parts are read as represented at block 4—4. If the DATA part conforms with the LRC and HASH parts, the DATA is considered to be acceptable. In any event the addressed device must respond in less than one millisecond. A response message may take the format given above, or it may include the following parts: Start Character, STCHR (5E hexadecimal), and a response character, RCHR, sent twice. The response character may be ACK (78 hexadecimal), NAK (19 hexadecimal), DEND (same code as CLOSEL), or BUSY (2C hexadecimal).

In general the station receiving a message will first place its transmission link switch (e.g. switch 12 for node no. 2) in the second cutoff mode. Then the one of the response messages is sent as represented at block 4-5. Having sent the response, the responding station executes a time delay so as to allow for transmission propagation about the loop (so that the response only can traverse the loop once), and having blocked a second traverse of the loop, the transmission link switch (e.g. switch 12 of node 2) is placed in its first transmitting mode.

Outline of Successful System Operation

In an actual system which has been successfully operated, provision is made for resolving conflicts where several nodes issue bid messages simultaneously. A more detailed outline of programming under these circumstances is as follows, with most of the steps of the outline being assigned sequential numbers for convenience of cross reference.

GAPREC—step one

This is an entry point at a one-millisecond gap for checking for input data. The sequence of steps following this entry point is entered after a communications gap is recognized pursuant to decision block 3-1 of FIG. 3.

SNDREQ?—step two

If the device has data to send (Send Request is set), then the bidding /sending routine is executed beginning at step eleven of this outline, and which corresponds to the sequence beginning at block 3-2 in FIG. 3.

FIRST CHAR.=CLOSEL?—step three

If the device is to receive data, the first character received must be the close link request character CLOSEL. See the discussion of block 4-1, FIG. 4, and compare step thirteen et seq. of this outline. A bidding station which is unsuccessful is branched to this step three from step fifteen of this outline.

If the first received character is not CLOSEL, then the program may return to a MAIN CODE routine not relevant to the present disclosure.

CLOSE LINK—step four

Make sure the link switch is in transmitting (closed) mode at this device. If the link switch was in cutoff (open) mode at this device, the bidding device will retry thus getting through.

READ NEXT CHAR—step five

START CHAR?—step six

Wait for bidding to finish, returning from step six to step five until a Start Character STCHR is received.

MESSAGE TO THIS DEVICE?—step seven

The "to" address in the message indicates whether the data is directed to the local device. The "to" address is sent twice and both address values must be the same before acceptance.

If the message is not to this device, the program may return to a MAIN CODE routine not relevant to the present disclosure.

RECEIVE DATA—step eight

See the discussion concerning block 4—4, FIG. 4.

DATA OK?—step nine, part A

OPEN LINK, NAK, DELAY (later inserted), CLOSE LINK—step nine, part B

In part A of step nine, the processor of component 60 may compute the LRC and HASH values for the received data, and compare the computed values with the received values for LRC and HASH. If the computed and received values do not match, then a NAK response is transmitted to indicate that the received data is defective. As explained hereafter in reference to step seventeen of this outline, a master device may count NAK responses to a message, and reset its Send Request register after a predetermined number of failures. For minor devices, attempts to send the data may continue indefinitely. Where the sending device is to retry sending the message, another communications gap will occur before the message may again be received. Thus if the received data is defective, the program branches from part A to part B of step nine, and then after execution of part B returns to a MAIN CODE routine not relevant to the present disclosure.

The DELAY procedure of part B of step nine was later inserted as explained in connection with step nineteen hereafter.

RESPOND—step 10

If the received data is good, an appropriate response is sent. See block 4-5, FIG. 4.

SEND (Bidding/Sending Routine)

As stated under step two above, if the device has data to send, then a branching takes place after step two to a bidding/sending routine. The entry point for this routine is designated "SEND". The steps of the SEND routine are designated eleven through 18, and are outlined as follows:

OPEN LINK—step eleven

Since the device needs to originate a message, it must cut off the direct loop path (otherwise oscillation will occur in the ring network because of the progressive amplification at the successive nodes during each traverse of the loop path).

GAPSND?—step twelve

In this step, the prospective sending station monitors the communication loop for another millisecond communication gap before transmission is allowed.

If data is received during the gap timing interval, the program branches to step three above.

SEND BID—step thirteen

In this step a bid for link control is made, the step thus corresponding to a portion of block 3-2, FIG. 3. The bid message comprises the close link request character (CLOSEL) and the sending device address (ADDR). The close link request character requests the previous link controller (e.g. the previous successful bidder prior to the communications gap) to shift its link switch to the transmitting (closed) condition. The address which forms part of the bid message enables the resolution of simultaneous bids by allowing the bidding device with the lowest address to rebid, while forcing devices with higher addresses to drop out of the bidding.

CLOSEL CHAR RECEIVED?—step fourteen

If the bidding device awaits for a predetermined time interval without receiving a communication, or if a close link request character is not received, the program branches to the MAIN CODE routine, and the bid is retried after detection of a further communications gap.

ADDR: DEVICE'S ADDR?—step fifteen, part A

WAIT 100 MICROSECONDS—step fifteen, part B

If a bid message has been received, the address part ADDR as received is compared with the local device address. If the address values are the same, there is no bidding conflict and the local device proceeds to send its data. See block 3-4, FIG. 3, and steps twenty-four et seq of this Outline.

If the received address part is lower than the local address, the local device has lost the bidding. Thus the program branches to step three above.

If the received address is higher than the address of the local device, the local device executes part B of step fifteen so as to allow time for losing bidders to follow steps three and four above. This prevents an unsuccessful bidding station from cutting off a first portion of a new bid message.

If the local device has the lower address, it rebids after part B of step fifteen, by returning to step thirteen above. In this way, contention can continue until all link switches except that of the bidder with the lowest address have been placed in transmitting (closed) condition. With a situation such as shown in FIG. 1 with only one link switch cutoff, a bid message from the associated device, e.g. at node 4, will be transmitted about the loop (via link switches 15, 11, 12, and 13) and be received at the bidding device. Thus the address in the received bid message will correspond to the local address. See block 3—3, FIG. 3.

SEND DATA—step sixteen

Send data and await a response. The details of this SEND DATA routine begin at step twenty-four of this outline.

SEND FAIL?—part A of step seventeen

>255 RETRIES?—part B of step seventeen

If the data transmission has failed (see part B of step twenty-seven), the program branches from part A to part B of step seventeen. The number of retries is incremented after each failure, and if the number of retries is not greater than 255, the program returns to the MAIN CODE routine without resetting the Send Request register (SNDREQ). It is then necessary to wait for a communications gap before executing a retry. If transmission has failed more than 255 times, the Send Request is reset before returning to MAIN CODE. See step eighteen which follows part B in this case.

RESET SNDREQ—step eighteen

If transmission is successful as determined in part A of step seventeen then the resetting of SNDREQ signals completion of data transmission, and the program returns to the MAIN CODE routine.

RESPOND

When a receiving station determines that received data is good (e.g. as a result of part A of step nine above), then a response is to be sent as represented at block 4-5, FIG. 4. This routine is outlined in the following which includes steps nineteen through twenty-three.

IMMEDIATE EXEC?—part A of step nineteen

OPEN LINE, ACK, DELAY (later inserted), CLOSE LINK—part B of step nineteen

When data has been received, the receiving station may determine that an acknowledgement (ACK) is all the response that is required; in this case, the program branches from part A to part B of step nineteen. Also where no response can be made, the local device will send the ACK message as indicated by part B. On the other hand, if the response can be made immediately, the program progresses to step twenty.

The DELAY procedure of part B of step nineteen, and the corresponding delays in part B of step nine and in part B of step twenty were later inserted, and may have a duration of 200 microseconds. These inserted time delays insure that the sending station will have received the respective response and shifted its link switch to cutoff mode. See step 3-6, FIG. 3, and the "OPEN LINK" step following step twenty-eight in this Outline.

DATA TO SEND—part A of step twenty

OPEN LINK, DEND, DELAY (later inserted), CLOSE LINK—part B of step twenty

In part A of this step, the processor determines whether the response requires the transmission of data. If not, the program branches to part B of step twenty and transmits an indication of command acceptance (DEND). The DEND transmission indicates an end of communication.

SEND DATA—step twenty-one

This routine begins at step twenty-four of this outline and corresponds to block 4-5, FIG. 4.

DELAY, CLOSE LINK—(later developed steps)

These steps follow step twenty-one and correspond to block 4-6, FIG. 4. A delay of 200 microseconds provides time for data to be transmitted through the buffers of the serial adapter such as 53 of the responding station, and time for the bidding station to shift its link switch to cutoff mode. The time delay also accommodates any time lags in the repeater circuitry intervening between the responding device and the bidding device. Thus, before the responding station has shifted its link switch (e.g. switch 12 at node 2) to its transmitting (closed) mode, the bidding station will have received the complete data message transmitted by the responding station (block 3-6, FIG. 3), and will have again shifted its link switch to cutoff (open) mode (block 3-7, FIG. 3). The objective is to maintain one of the link switches such as 11 through 15, FIG. 1, in cutoff mode at all times (while avoiding a communications gap at stations beyond the bidding station during the transmission of response data). Such concept of maintaining one link switch in cutoff mode at all times was considered crucial to successful operation of the actual system of the present Outline, this system being designated the A Line System. (The lack of a step number for these steps of the Outline indicates their later insertion to effect successful operation. Delays were also later inserted before shifting the link switch of the responding station to transmitting mode at part B of steps nine, nineteen and twenty.)

SEND FAIL?—step twenty-two

If the failure indication of part B of step twenty-seven has not been actuated, the response has been successfully transmitted, and the processor returns to the MAIN CODE. If the response failed to get through, processing progresses to step twenty-three which follows.

SET SNDREQ—step twenty-three

By setting the Send Request, SNDREQ, the processor is set up to retry sending the response upon detection of a communications gap of one millisecond.

After setting up to retry sending the response when a new communications gap is found, the program returns to the MAIN CODE routine.

SEND DATA

This routine is entered at steps sixteen and twenty-one of this outline, and is summarized in the following which includes steps twenty-four through twenty-eight.

OPEN LINK, SEND START CHAR, TOADDR, TOADDR, and DEVICE ADDR—step twenty-four

When a bidding station determines that the loop is complete at step fifteen, part A, the bidding station should have its link switch (e.g. 14, for node 4) in the cutoff (open) mode. To insure this, however, an Open Link command is transmitted by the processor of component 60 for making certain that line 51, FIG. 2, is at the logical one transmit cutoff potential. Transmission of the Start Character, STCHR, terminates bidding. The further parts of the message have been discussed in relation to block 3-4, FIG. 3. The address of the intended recipient, TOADDR, is sent twice as previously mentioned. Then the local device address, ADDR, is sent.

SEND REST OF DATA—step twenty-five

The bidding station, having won the bid, may send a command (COM) to the device addressed or may send the status (STATUS) of the local device in responding to a command from the device addressed.

SEND LRC, HASH—step twenty-six

LRC is defined as a longitudinal redundancy check, namely the exclusive OR bytewise of all bytes starting with ADDR, and including any command, COM, or STATUS response, and any optional data (DATA) for the receiving device.

HASH is defined as the byte sum of all bytes starting with ADDR through DATA.

This step has been modified to omit a final CLOSE LINK command, so as to insure that a responding station will have shifted its link switch to cutoff mode before the bidding station shifts its link switch (e.g. 14, FIG. 1) to the transmitting (closed) mode.

RESPONSE?—part A of step twenty-seven

INDICATE FAILURE—part B of step twenty-seven

A response to the message of steps twenty-four, twenty-five and twenty-six is required, at least an acknowledgement, (ACK), or a Message in Error, Retry (NAK). If the message was an original transmission from the bidder, then the response can be a transmission of data. It can also be ACK, NAK, Device End (DEND), or BUSY. See the previous discussion in relation to block 3-5, FIG. 3, and in relation to block 4—4, FIG. 4. The DEND response indicates that the communication has been accepted and the command performed. No status report (STATUS) can be returned by the responding device. The BUSY response indicates that the responding device cannot handle the request at this time. A master station will automatically retry 255 times when a BUSY response is received. Minor devices will discontinue trying to send the message.

If there is no response within one millisecond, then communication failure is indicated, and the program proceeds from part A to part B of step twenty-seven. Having registered the failure, the processor proceeds to the OPEN LINK step following step twenty-eight.

CLOSE LINK (later inserted step)

Before the link switch of the sending station is placed in the transmitting (closed) mode, the sending station is to ensure that a receiving station has received the transmitted data and placed its link switch in cutoff (open) mode to transmit the response. Thus the sending station waits for the response as shown by step twenty-seven, part A, and only shifts the link switch to transmitting mode if a response is actually received.

If no response is received in part A of step twenty-seven within one millisecond, the link switch is not closed, the program branching from part B of step twenty-seven to the step following step twenty-eight of this outline.

NAK?—step twenty-eight

After closing the link switch, if the sending station determines that the response received was a NAK (message in Error, Retry), then the program returns to part B of step twenty-seven to indicate a communication failure, and then goes on to the OPEN LINK step which follows herebelow.

OPEN LINK (later inserted step)

If a response is received which is not a NAK, then when the complete response has been received, the sending station promptly shifts its link switch to the cutoff (open) mode before the responding station shifts its link switch to the transmitting (closed) mode (following a time delay). See block 3-7, FIG. 3.

If a failure in the transmission occurred resulting in a NAK, the link switch of the sending station will have been shifted to transmitting (closed) mode; accordingly the program branches from part B of step twenty-seven to the present "OPEN LINK" step.

Thus in any event at the end of the SEND DATA routine, the link switch of the sending station will be in the cutoff (open) mode.

If a responding station has data to send (part A of step twenty), it follows the routine of steps twenty-four et seq above, but then shifts its link switch to transmitting (closed) mode after a time delay of 200 microseconds, so that the sending station (the bidder) has time to shift its link to cutoff (open) mode after receiving the complete message.

In the system which has been successfully operated, exemplary components had the following implementation:

Fiber Optic Interface

Optical detector OD1 (31, FIG. 2)—type SD 4478.

Electronic Receiver (30, FIG. 2)—cascade connection six line receivers A1-1, A1-2, A1-3, A2-1, A2-2, and A2-3-type MC 10116. Input circuit of A1-1: pin 10 of A1-1 connected to upper terminal of grounded C12 (680 pF, 100 V) and to upper terminal of R11 (20 kilohms, 1%); pin 9 connected to upper terminal of R10 (20 kilohms, 1%) and to cathode of OD1; opposite terminals of C12 and OD1 to ground; opposite terminals of R10 and R11 to pin 11 of A1-1 and to upper terminal of grounded C8 (0.1 microfarad, 100 V), lower terminal of C8 to ground. Pin 7 of A1-1 to pin 5 of A1-2 and to grounded resistor R12 (200 ohms, 1%); pin 6 of A1-1 to pin 4 of A1-2 and to grounded resistor R13 (226 ohms, 1%); pin 3 of A1-2 to grounded resistor R14 (200 ohms, 1%) and to left terminal of C10 (0.001 microfarad, 100 V); right terminal of C10 to upper terminal of R16 (1 kilohm, 1%) and to pin 13 of A1-3; pin 2 of A1-2 to grounded R15 (200 ohm, 1%); pin 12 of A1-3 via one kilohm resistor (1%) to lower terminal of R16 and to pin 11 of A1-1; pin 15 of A1-3 to grounded R18 (301 ohm, 1%) and to left end of R20 (1 K, 1%); right end of R20 to pin 10 of A2-1 and via R7 (10 kilohm, 1%) to pin 7 of A2-1; pin 14 of A1-3 to grounded R19 (301 ohms, 1%); pin 7 of A2-1 to R7, to grounded R6 (1 kilohm, 1%) and to pin 5 of A2-2; pin 9 of A2-1 to pin 6 of A2-1 via R8 (1 kilohm, 1%) and to pin 11 of A2-2 via R9 (1 kilohm, 1%); pin 6 of A2-1 to R8, to grounded R5 (1 kilohm, 1%) and to pin 4 of A2-2; pin 11 of A2-2 to R9 and to grounded C9 (0.1 microfarad, 100 V); pin 3 of A2-2 to grounded R4 (1 kilohm, 1%), and to pin 13 of A2-3; pin 2 of A2-2 to grounded R3 (1 kilohm, 1%) and to pin 12 of A2-3. Output circuit of A2-3: pin 15 to grounded R2 (1 kilohm, 1%) and to pin 3 of connector J2 (RRCV HI); pin 14 of A2-3 to grounded R1 (1 kilohm, 1%) and to pin 4 of connector J2 (RRCV LO).

Connector (23, FIG. 2): J2 pin 2—ground, J2 pin 3 RRCV HI, J2 pin 4—RRCV LO, J2 pin 5—ground.

Connector (39, FIG. 2): J1 pin 1—plus five volts (+5 VT, transmit), J1 pin 2—ground, J1 pin 5—ground, J1 pin 6—plus five volts (+5 VR, receive).

Power supply circuit: J1 pin 6 to plus terminals of grounded C5 (220 microfarads, 6.3 V) and grounded C6 (0.47 microfarad, 50 V) and to left terminal of L1 (56 microhenry; ground terminal (GND) to J1 pins 2 and 5, and to J2 pins 2 and 5; right terminal of L1 to grounded C7 (100 microfarads, 6.3 V), grounded C1 (1 microfarad, 100 V) and grounded C2 (0.1 microfarad, 100) and to +5 V output (C1 and C2 are decoupling capacitors for the integrated circuits packs A1 and A2).

Electronic Transmitter Circuit (32, FIG. 2): J1 pin 1 (+5 VT) to plus terminal of grounded C11 (220 microfarads, 6.3 V), and to pins 8 (VCC) and 5 (BCV EN) of A3 (Type 75117), and to upper terminals of R21 (68 ohms, 1 watt, 5%), and to plus terminals of C3 (0.1 microfarad, 100 V) and of C4 (0.1 microfarad, 100 V) and to +5 V output (C3 and C4 are decoupling capacitors for integrated circuit packs); A3 (type 75117) and A4 (type 75452); ground terminal (GND) to J1 pins 2 and 5, and to J2 pins 2 and 5, and to pin 1 (1N), pin 4 (GND) and pin 7 (D ENABLE) of A3; input (RXMIT HI) to J1 pin 3 and to pin 3 (A) of A3; input (RXMIT LO) to J1 pin 4 and to pin 2 (B) of A3; pin 6 (OUT) of A3 to pins 1, 2, 6 and 7 of A4 (type 75); pins 3 and 5 of A4 to lower terminal of R21 and to anode of optical emitter OE1 type SE 4352 (33, FIG. 2).

Optical emitter OE1 (33, FIG. 2)—type SE 4352—anode of OE1 to pins 3 and 5 of A4 and to R21; cathode of OE1 to ground.

Twenty-Six column Printer Control

Connector (43, FIG. 2): J3 pin 3 (RRCV HI) to pin 5 of A42, type 75118 (44, FIG. 2); J3 pin 4 (RRCV LO) to pin 7 of A42 (44, FIG. 2).

Pulse amplifier (44, FIG. 2)—A421 (type 75118): pin 5 to J3 pin 3; pin 7 to J3 pin 4; pin 8 to ground; pins 10 and 13 via R4 (10 kilohms) to +5 V; pins 11 and 12 (RECEIVE DATA) to pin 8 of A221-type 6502 (NOR gate 45, FIG. 2) and to pin 20 of A13—IM 6402-1 (Serial Adapter 53, FIG. 2); pin 16 to +5 V.

NOR gate A221-LS02 (45, FIG. 2): pin 8 to pins 11 and 12 of A421 and to pin 20 of A13; pin 9 (TRANSMIT CUTOFF) to pin 38-P27 of A41-8748 EPROM (component 60, FIG. 2); pin 10 to pin 5 of A222-LS02 (46, FIG. 2).

NOR gate A222-6502 (46, FIG. 2): pin 5 to pin 10 of A221; pin 6 to pin 6 of A12-LS04 (Inverter 57, FIG. 2); pin 4 to pins 14 and 15 of A422 (pulse amplifier 47, FIG. 2).

Pulse amplifier A422-75118 (47, FIG. 2): pins 1 and 2 to lower terminal of R2-120 ohm (47a, FIG. 2) and to J4 pin 3 (RXMIT LO); pins 3 and 4 to upper terminal of R2 and to J4 pin 4 (RXMIT HI).

Connector (49, FIG. 2): J4 pin (RXMIT LO) to J1 pin 3; J4 pin 4 (RXMIT HI) to J1 pin 4.

Serial Adapter—A13, IM 6402-1, IOC, UART Socket (component 53, FIG. 2): pin 1 (VCC) to +5 V; pin 3 (GND) to ground; pin 5 (RBR8) and pin 33 (TBR8) to pin 19 (DB7) of A41, etc. to provide eight conductors of the multiconductor path (61, FIG. 2); pin 23 (TBR1) to pin 10 ($\overline{WR}$) of A41 via write line (63, FIG. 2); pin 4 (RRD) and pin 18 (DRR) to pin 8 (RD) of A41; pin 40—2 MHZ (TRC) and pin 17—2 MHZ (RRC) to 2 MHZ output of node clock circuits (64, FIG. 2); pin 21 (MR) to RESET; pin 19 (DR) to pin 1 of A41 via data ready line (DR, FIG. 2); pin 22 (TBRE) to pin 39 of A41; pin 20 (RBI) to RECEIVE DATA line (52, FIG. 2); pin 25 (TRO) to pin 5 of A12-LS04; pin 39 (P5), pin 35 (PI), pin 36 (SBS), and pin 16 (SFO) to ground; pin 38 (WLS1), pin 37 (WLS2) and pin 34 (CRC) to +5 V.

Inverter A12-LS04: pin 5 to pin 25 of A13 (53, FIG. 2); pin 6 to pin 6 of A222-LS02 (46, FIG. 2).

Processor and Protocol Control Circuits—A41-type 8748 EPROM (60, FIG. 2): pin 4 ($\overline{RESET}$) to line $\overline{RST}$; pin 2 (XTAL 1) to 6 MHZ output of the node clock circuits (64, FIG. 2); pin 3 (XTAL 2) to 6 MHZ of the node clock circuits (64, FIG. 2); pin 33 (P16) to line $\overline{TST}$; pin 7 (EA) and pin 20 (VBS) to ground; pin 6 ($\overline{INT}$) to J1 pin 39 (COVER OPEN); pin 32 (P15) to J1 pin 38 (LOW PAPER); pin 26 (VDD) and pin 40 (VCC) to +5 V; pin 39 (T1) to Transmit Buffer Empty line (TBRE, FIG. 2); pin 1 (TØ) to Data Ready line (DR, FIG. 2); pin 38 (P27) to Transmit Cutoff line (51, FIG. 2); pin 37 (P26), pin 36 (P25), pin 35 (P24) to three high order bits of a node address selector switch (weights 64, 32 and 16); pin 24 (P23), pin 23 (P22), pin 22 (P21) and pin 21 (P20) to four low order bits of the node address selector switch (weights 8, 4, 2 and 1); pins 19, 18, 17, 16, 15, 14, 13 and 12 (DB7, DB6, DB5, DB4, DB3, DB2, DB1, DBØ) to eight lines of data path to A13 (data path 61, FIG. 2); pin 10 ($\overline{WR}$) to UART WR line (63, FIG. 2); pin 8 (RD) to UART RD line (62, FIG. 2); pin 29 (P10) to output circuits (70, FIG. 2) via ACT line; pin 28 (P11), via RTS line; pin 29 (P12), via TD line; pin 30 (P13), to DTR line; pin 31 (P14) to $\overline{BTS}$ line; lines RTS, TD, DTR and $\overline{BTS}$ also leading to the output circuits (70, FIG. 2).

In the foregoing, the abbreviation "pf" refers to picofarads, the abbreviation "V" refers to volts, and the abbreviation "K" stands for kilohm.

Exemplary Loop Installation

In an exemplary layout according to FIG. 1, a first fiber optic interface FOIA has its output (like 22, FIG. 2) connected via a first fiber optic line L1 to a second fiber optic interface FOIB. The second fiber optic interface FOIB was connected via a second fiber optic line L2 to a third fiber optic interface FOIC which in turn was connected to the first fiber optic interface FOIA via a third fiber optic line L3.

A printer control (such as 40, FIG. 2) had its electrical input port (such as 43) connected to the electrical output port (such as 23, FIG. 2), but had its electrical output port (such as 49, FIG. 2) connected to the electrical input port of a keyboard display control. The electrical output port of the keyboard display control in turn was connected to the electrical input port (such as 24) of the first fiber optic interface FOIA.

Similarly, the second fiber optic interface FOIB has an electric path between its electrical output and input ports (like 23, 24, FIG. 2) including two master computers, and the third fiber optic interface FOIC couples into the overall loop a printer control and a cathode ray tube display. Thus there are two local stations which are locally interconnected by inexpensive electrical cables associated with each fiber optic interface. Either of the local stations can be bypassed by rearranging the local electrical cables. The local stations are linked by fiber optic lines so as to assure freedom from electrical and magnetic interference over the extended paths between local sites. In a restaurant environment the printer and the keyboard and display may be located at a cashier's station while the remaining components may be in management offices or the like.

Pursuant to 37 CFR 1.96 (a)(2)(ii), a computer printout (in continuous web form) is found in an accompanying protective cover and is designated "COMPUTER PRINTOUT APPENDIX PURSUANT TO 37 CFR 1.96 (a)(2)(ii)". For the sake of identification of this material, a copy thereof is being included on the following twenty-five pages of the application as filed.

The parts of the accompanying computer printout have the following titles:

(I) ALINE MASTER I/O INTERFACE V2.6
(II) ALINE CONSOLE CONTROLLER V2.1
(III) ALINE PRINTER CONTROLLER V2.0
(IV) ALINE CRT CONTROLLER V1.1

```
            CALL    PUTCHR
TSTLNK      IN      ALSTAT
            ANT     ALDR
            JNZ     RNAK

DCR     C
            JNZ     TSTLNK
            INR     C              CLEAR Z BIT TO SHOW BAD TRANSMISSION
            RET                    RETURN LEAVING SEND MESSAGE SYSREQ SET FOR RETRY
RAKNAK      LXT     H,RESBUF       GET RESPONSE
            MVI     A,FIXCHR       CLOSE LINK FOR RESPONSE
            SIM
            CALL    RDATA
            LXT     H,RESBUF       SEE IF VALID RESPONSE
            MOV     A,M            MUST START WITH START CHAR
            CPI     STCHR
            RNZ
            MVI     C,2
RAK1        MOV     A,M            TEST IF RESPONSE IS ACK
            CPI     ACKCHR
            JZ      RACK
            CPI     BSYCHR         OR BUSY (LIKE MASTER HAS POWERED UP AFTER FAIL)
            JZ      RACK
            INX     H
            DCR     C
            JNZ     RAK1
            MVI     A,BRKCHR       NO REC. RESP. SO MAKE SURE LINK IS BROKEN
            SIM
RNAK
            LDA     NAKS
            DCR     A              CHECK FOR TOO MANY NAKS
            STA     NAKS
            RNZ                    RETURN WITH Z BIT RESET TO SHOW NAK
RACK        LDA     DEVADR         WHICH DEVICE IS DONE ?
            ANI     1
            JNZ     CLKEY
            STA     SYSREQ         EVEN ADDRESS IS CRT
            RET
CLKEY       XRA     A              ODD IS KEYBOARD
            STA     KEYMASK
            RET
************************************************
            DS      20
STACK       DS      2
NAKS        DS      1              NAK COUNT
TOADR       DS      1              ADDRESS TO SEND RESPONSE TO
TOADRKB     DS      1              ADDRESS TO SEND KEY TO
KEYMASK     DS      1              FLAG USED TO HANDLE KEY PROCESSING
RECDEV      DS      1              SAVE AREA FOR ADDRESSED RECEIVED AS DEVICES
DEVADR      DS      1              WHICH DEVICE SENDS DATA (CRT,KEYBOARD)
MESSAGE     DS      2              POINTER AT BUFFER OF DATA TO SEND
RESBUF      DS      3
KEYBUF      DS      3              BUFFER FOR KEY 0=LEN,1=STATUS 2=KEY
FROMAD      DS      0              FROM ADDRESS IN INPUT
INBUFF      DS      1              INPUT BUFFER
COMMAND     DS      1
DATA        DS      800
            CALL    PUTCHR
BIDIN       CALL    GETCHR         NOW WAIT FOR CLOSE LINK CHAR TO COME
            JZ      GAP
            CPI     CLOSEL

JNZ     READAL
            CALL    GETCHR         GET BID ADDRESS. IF NOTE COMES THEN ERROR
            JZ      GAP
            CMP     C              CHECK IF BID WON LOST
            JM      RCLOSE         LOST BID
            JZ      BIDWON
            MVI     B,16           100 MICROSEC DELAY TO ALLOW LINKS TO BE CLOSED
BIDDLY      DCR     B
            JNZ     BIDDLY
            JMP     BID
BIDWON      CALL    SEND
            MVI     A,BRKCHR       MAKE SURE LINK IS OPEN
```

```
              SIM
              JNZ     READAL         Z BIT CLEAR INDICATES NAK'D TRANSMISSION
              JMP     SETNAK         ELSE GOOD TRANS. RESET NAKS
    *         Z BIT SET INDICATES GOOD TRANSMISSION
    SEND      LHLD    MESSAGE        GET MESSAGE TO SEND
              MOV     C,M            GET LENGTH
              INX     H
              MVI     A,BRKCHR       BREAK LINK FOR RESPONSE
              SIM
              MVI     A,STCHR        START CHAR
              OUT     ALOUT
              LDA     TOADR          GET SENDERS ADDRESS TO WHOM REPLY GOES
              CALL    PUTCHR         TO ADDRESS
              CALL    PUTCHR         REDUNDANT TO ADDRESS
              LDA     DEVADR         FROM ADDRESS
              CALL    PUTCHR
              MOV     D,A            START LRC,HASH
              MOV     E,A
    SNDLOP    MOV     A,M            SEND NEXT CHAR
              CALL    PUTCHR
              ADD     E              HASH CALC
              MOV     E,A
              MOV     A,M
              XRA     D              LRC CALC
              MOV     D,A
              DCR     C
              INX     H
              JNZ     SNDLOP
              CALL    PUTCHR         SEND LRC
              MOV     A,E
              CALL    PUTCHR         SEND HASH
              MVI     C,CHRDLY       CLEAR UART OF CHARS CRT SENT ON LINK
    CLRUART   IN      ALSTAT
              ANI     ALDR
              JZ      CLRDEC
              IN      ALIN           CLEAR THEN CHAR
              JMP     CLRUART-2
    CLRDEC    DCR     C
              JNZ     CLRUART
              MVI     C,TIM1         WAIT TILL TIMEOUT1 FOR RESPONSE
    RESP      IN      ALSTAT
              ANI     ALDR
              JNZ     RAKNAK         SEE IF ACK/NAK
              DCR     C
              JNZ     RESP
              MVI     C,TIM0         SINCE NO RESPONSE TEST LINK FOR DOWN
              MOV     A,TSTCHR
    ACKNAK    MVI     A,BRKCHR       BREAK THE LINK FOR RESPONSE
              SIM
              MVI     A,STCHR        START CHAR
              OUT     ALOUT
              MOV     A,B
              CALL    PUTCHR
              CALL    PUTCHR
              MVI     A,27           WAIT FOR CHARS TO COMPLETE BEFORE CLOSE
              DCR     A
              JNZ     $-1
              MVI     A,FIXCHR       CLOSE LINK AGAIN
              SIM
              RET
    NAK       MVI     B,NAKCHR       NAK SENDER
              CALL    ACKNAK
              JMP     GAP
    RDATA     MVI     B,CHRDLY       READ DATA
    RDTIM     IN      ALSTAT         WAIT TILL A CHAR TIME PASSES
              ANI     ALDR
              JNZ     RGOT
              DCR     B
              JNZ     RDTIM
              RET
    RGOT      IN      ALIN           SAVE CHAR
              MOV     M,A
              XRA     D              CALC   LRC
```

```
                MOV     D,A
                MOV     A,M
                ADD     E                   CALC HASH
                MOV     F,A
                INX     H
                JMP     RDATA
GETCHR          MVI     D,TIMO
GETCHR1         IN      ALSTAT              READ A CHAR FROM ALINE
                ANI     ALDR
                JNZ     GETCHR2
                DCR     D
                JNZ     GETCHR1
                RET
GETCHR2         IN      ALIN
                RET
PUTCHR          PUSH    PSW                 OUTPUT A CHAR TO ALINE
                IN      ALSTAT
                ANI     ALTBR
                JZ      PUTCHR+1
                POP     PSW
                OUT     ALOUT
                RET
BREAK           IN      ALSTAT              MAKE SURE NO CHAR HAS COME IN MEAN TIME
                ANI     ALDR
                JNZ     RCHR
                MVI     A,BRKCHR            BREAK LINK FOR TRANSMIT
                SIM
                MVI     B,GAPSND            WAIT SENDING GAP TIME BEFORE SENDING
BRKSND          IN      ALSTAT
                ANI     ALDR
                JNZ     RCHR
                DCR     B
                JNZ     BRKSND
BID             MVI     A,CLOSEL            REQUEST THAT LINK BE CLOSED
                OUT     ALOUT
                IN      ALNADR              AND BID
                MOV     C,A
                MVI     B,GAPREC
GAP1            IN      ALSTAT              TIME OUT FOR GAP
                ANI     ALDR
                JNZ     GAPCLR
                DCR     B
                JNZ     GAP1
                JMP     GOTGAP              GAP FOUND
GAPCLR          IN      ALIN                CLEAR CHAR, GET GAP
                JMP     GAP
GOTGAP          LDA     SYSREQ              DATA TO SEND ?
                ORA     A
                JNZ     BREAK               YES
GKEY            LDA     KEYMASK             WAITING FOR A KEY ?
                ORA     A
                JNZ     GETKEY
GETO            CALL    GETCHR
                JZ      GOTGAP
RCHR            IN      ALIN                SEE IF CLOSE LINK REQUEST
                CPI     CLOSEL              IF NOT THEN IT WAS NOISE ON LINK
                JNZ     READAL              ELSE MAKE SURE OUR LINK IS CLOSED
RCLOSE          MVI     A,FIXCHR
                SIM
WSTRT           CALL    GETCHR
                JZ      WSTRT
                CPI     STCHR               START CHAR ?
                JNZ     WSTRT
                CALL    GETCHR
                MOV     B,A
                ANI     0FFH                MASK BIT0 BECAUSE MAY BE TO CRT OR KEYBOARD
                CMP     C                   TO US?
                JNZ     GAP                 NOPE GET GAP
                CALL    GETCHR              REDUNDANT CHAR
                CMP     B
                JNZ     GAP                 NOT TO US
                STA     RECDEV              DEVICE ADDRESS SAVED FOR ACK TEST BELOW
                LXI     D,0                 ZERO LRC,HASH
                LXI     H,INBUFF            INPUT BUFFER
```

```
            CALL    RDATA           GET DATA
            DCX     H               CHECK LRC,HASH
            MOV     A,M
            CMP     D               INPUT(HASH)=CALC(LRC)
            JNZ     NAK
            ADD     A               CALC(HASH)=2*INPUT(HASH)+INPUT(LRC)
            DCX     H
            ADD     M
            CMP     E
            JNZ     NAK
            MVI     M,EOBUF         MARK END OF COMMAND
            LDA     RECDEV
            ANI     1               SEE IF CRT OF KEYB ADDRESS
            JNZ     ADKB
            LDA     SYSREQ          SEE IF CRT BUSY ALREADY
ADTBUSY     ORA     A
            JNZ     ADBUSY          SEND BUSY IF SO
            JMP     ACK             ELSE ACK
ADKB        LDA     COMMAND         CLEAR BUFFER COMMAND OVERRIDES RESPONSE
            ANI     CLRBUF
            JNZ     ACK
            LDA     KEYMASK         ELSE IF WAITING FOR A KEY THEN SEND BUSY
            JMP     ADTBUSY
ADBUSY      MVI     B,BSYCHR
            JMP     ACKNAK
ACK         MVI     B,ACKCHR        ACK SENDER
CREG3       EQU     3
CREG4       EQU     4
CREG5       EQU     5
CREG6       EQU     6

CXR         EQU     0CH             X CURSOR OF 5027
CYR         EQU     0DH             Y CURSOR OF 5027
CSTART      EQU     0EH             TRIGGER TO 5027 TO START DISPLAY
C5027       EQU     0AH             RESET 5027
ALDR        EQU     8               MASK FOR UART DR STATUS
ALTBR       EQU     10H             MASK FOR UART TBR STATUS
ALNADR      EQU     22H             ALINE ADDRESS
BUZZER      EQU     22H             BUZZER PORT ADDRESS
BUZZ        EQU     1               TURN BUZZER ON
GAPREC      EQU     51              TIME OUT FOR PROTOCOL GAP
GAPSND      EQU     51              TIME OUT FOR SENDING
TIM0        EQU     20              TIMEOUT0
TIM1        EQU     77              TIMEOUT1
CHRDLY      EQU     12              1 CHAR TIME 88 MICROSEC
DVRADR      EQU     7EH             POWER UP RESTART MESSAGE TO ADDRESS
MAXNAK      EQU     255             MAXIMUM NAKS
NAKCHR      EQU     19H
ACKCHR      EQU     78H
BSYCHR      EQU     2CH
CLOSEL      EQU     55H
STCHR       EQU     5EH
TSTCHR      EQU     1
BRKCHR      EQU     0C0H            BREAK LINK OUTPUT ON SOD
FIXCHR      EQU     40H             RESTORE LINK
EOBUF       EQU     3               END OF BUFFER MARKER
*           ATTRIBUTES FOR CRT ARE BY BIT
*           BIT     USE
*           0       BLINK
*           1       REVID
*           2       UNDERLINE
*
*           BIT 3 IS THE PROCESSOR/CRT ENABLE BIT. IT IS ALWAYS ON IN HATR
FHATR       EQU     PROCRE          INITIAL ATTRIBUTE VALUE
FSATR       EQU     80H             INITIAL 'SOFT' ATTRIBUTE VALUE
*                                   IT IS AUTOCRLF
AUTOLF      EQU     80H
CURSOR      EQU     2               MASK FOR CURSOR ON BIT IN FSATR
BLANK       EQU     ' '
LINES       EQU     16              NUMBER OF LINES ON CRT
CHARS       EQU     40              NUMBER OF CHARS ON LINE
ACTWID      EQU     64              IN SMALL CRT EACH LINE IS STORED IN 64 BYTES
EXCESS      EQU     ACTWID-CHARS    EXTRA CHARS TO IGNORE AS A RESULT
CRTMEM      EQU     800H
```

```
DSPLOC    EQU     R005H      LOCATION OF POWER UP VERSION MESSAGE
RAM       EQU     4000H
RAMLEN    EQU     03FFH
RAMPAT    EQU     55H        PATTERN FOR RAM TEST
TSTKEY    EQU     3          KEY CODE FOR SELF TEST
CR        EQU     00H        CARRIAGE RETURN
LF        EQU     10         LINE FEED
ESC       EQU     18H        ESCAPE CHAR
DEL       EQU     7FH        DELETE CHAR
TABC      EQU     9          TAB
****************************************************
SETNAK    MVI     A,MAXNAK   RE-INITIALIZE NAK COUNT
          STA     NAKS
GAP
READAL    IN      ALNADR     THIS DEVICES ADDRESS
          MOV     C,A
          CALL    PUTCHR
                                        DELAY FOR UART(ASSUMES 1 LINK TIME USED ALREADY)
TUMPU     MOV     R1,#15
          IN      A,BUS
TUMPUT    JT0     TUMPU
          DJNZ    R1,TUMPUT
          MOV     R1,#TIME1              WAIT FOR RESPONSE
TRES      JT0     RAKNAK
          DJNZ    R1,TRES
          JMP     RNAK       TIMEOUT ON LINK
RAKNAK    MOV     R0,#18H    INPUT BUFFER
          IN      A,BUS      SEE THAT START CHAR IS FIRST
          XRL     A,#STCHR   IF NOT THEN NOISE ON LINK SO IGNORE
          JNZ     SRET
          ANL     P2,#7FH    CLOSE LINK TO LET RESPONSE GO AROUND LINK
          CALL    RDATA
          DEC     R0         GET LAST CHAR IN BUFFER
          MOV     R1,#2      TEST EACH CHAR
RCHK      MOV     A,@R0
          XRL     A,#ACKCHR
          JZ      RACK
          MOV     A,@R0
          XRL     A,#BSYCHR
          JZ      RACK
          MOV     A,@R0
          XRL     A,#NAKCHR
          JZ      RNAK
          DEC     R0                     POINT AT NEXT CHAR
          DJNZ    R1,RCHK
RNAK      IN      A,BUS      MAKE SURE UART IS CLEAR AFTER TESTING LINK
          DJNZ    R7,SRET    TRY AGAIN MAXNAKS TIMES
RACK      CLR     F0         DON'T WANT TO SEND ANYMORE
SRET      RET
          TITLE   'ALINE CRT CONTROLLER V1.1
*         ALNCRT  ALINE CRT CONTROLLER
*
*
*         HISTORY
*
*         AUTHOR  JOE KUBLER
*
*         VER 1.0 SEPT. 3,1979
*
*         VER 1.1 APRIL 3,1981
*         ADDED SELF TEST SOFTWARE
*
*
*                 CONSTANTS
WRT       EQU     1          WRITE COMMAND FROM ALINE
KEYRD     EQU     2          READ KEY COMMAND FROM ALINK TO DEVICE ALINE ADDRESS+1
KEYRDY    EQU     1          KEYBOARD READY STATUS BIT
KEYST     EQU     11H        KEYBOARD STATUS PORT
KEYDB     EQU     10H        KEYBOARD DATA PORT
BUZZC     EQU     4          BUZZER ON COMMAND
CLRBUF    EQU     20H        CLEAR KEYS AND READ FIRST KEY COMMAND
KEYTIM    EQU     100        TIMEOUT TO CLEAR KEYS
BUZTIM    EQU     0A23H      BUZZER ON TEST TIMEOUT
ALSTAT    EQU     21H        ALINE UART STATUS INPUT PORT
ALIN      EQU     20H        ALINE INPUT
ALOUT     EQU     20H        ALINE OUTPUT
CRT       EQU     21H        CRT REFRESH ENABLE/HI LOW RAM SELECT
```

```
PROCRE  EQU     8               PROCESSOR RAM ENABLE VALUE (BIT 3)
CREG0   EQU     0
CREG1   EQU     1
CREG2   EQU     2

BREAK   MOV     R2,#GAPSND      WAIT TO SEND
BRKSND  JFO     GAPCL           IF ANYONE BEAT US SEE WHAT THEY SENT
        DJNZ    R2,BRKSND
        ORL     P2,#80H         BREAK LINK TO BID

BID     MOV     A,#CLOSEL       MAKE SURE OTHER DEVICES CLOSE LINK
        MOV     R2,#CLOSEL
        CALL    PUTCHR
        MOV     A,R3             BID TO MAKE SURE OF ONLY ONE SENDER
        MOV     R2,A
        CALL    PUTCHR
        CALL    GETCHR
        JNC     BRKT
BRKG    JMP     GAP
BRKT    XRL     A,#CLOSEL
        JNZ     BRKG
        CALL    GETCHR          SEE IF WE WON BID
        JC      BRKG            TIMEOUT
        CPL     A               SUBTRACT A FROM R3 (RECEIVED FROM OUR ADDR)
        INC     A
        ADD     A,R3
        JB7     BIDDLY          OUR ID IS LOWER SO REBID
        JZ      TBWON           WE WON
        ANL     P2,#7FH
        JMP     RCHR            CONFLICT. IE SOMEONE ELSE IS WAITING FOR US
BIDDLY  MOV     R2,#20
        DJNZ    R2,$
        JMP     BID
TBWON   CALL    TSEND
        ORL     P2,#80H         MAKE SURE LINK IS OPEN
        JFO     GAP
        JMP     SETWAK
*
        ORG     100H
TSEND   ORL     P2,#80H         BREAK LINK FOR RESPONSE
        MOV     R0,#BUFA
        MOV     R1,#1
        MOV     A,R3
        MOV     R4,A
        MOV     R5,A
TDATA   MOV     R2,#STCHR       START CHAR
        CALL    PUTCHR
        MOV     A,@R0           TO ADDRESS
        MOV     R2,A
        CALL    PUTCHR
        CALL    PUTCHR          REDUNDANT
        MOV     A,R3            OUR ADDRESS (FIRST CHAR IN HASH LRC)
        MOV     R2,A
        CALL    PUTCHR
TDLOOP  INC     R0              SEND THE REST OF THE CHARS
        MOV     A,@R0           GET CHAR TO SEND
        MOV     R2,A
        CALL    PUTCHR          SEND IT
        XRL     A,R4            LRC IT
        MOV     R4,A
        MOV     A,R5            HASH
        ADD     A,@R0
        MOV     R5,A
        DJNZ    R1,TDLOOP       DATA COUNTER
        MOV     A,R4            SEND LRC
        MOV     R2,A
        CALL    PUTCHR
        MOV     A,R5            SEND HASH
        MOV     R2,A
```

```
              MOV     R5,#0           BYTE COUNT
              MOV     R0,#0           READ IN THE DATA AT R0
              CALL    RDATA           CHECK LRC. CALC(LRC) = REC(HASH)
RDONE         DEC     R0

MOV     A,@R0
              XRL     A,R4
              JNZ     NAK             BAD LRC
              DEC     R0              FIX HASH. CALC(HASH)=HASH+REC(LRC)+REC(HASH)
              MOV     A,R5
              SUB     A,@R0
              INC     R0
              SUB     A,@R0
              XRL     A,@R0
              JNZ     NAK
              JMP     COMMAND
ACK           MOV     R2,#ACKCHR
ACKNAK        MOV     A,#STCHR
              ORL     P2,#80H         BREAK LINK FOR RESPONSE
              MOVX    @R1,A
ANW
              CALL    PUTCHR
              CALL    PUTCHR
              MOV     R2,#40
              DJNZ    R2,$
              ANL     P2,#7FH         CLOSE LINK AGAIN
              RET
NAK           MOV     R2,#NAKCHR      NAK SENDER
              CALL    ACKNAK
              MOV     R0,#BUFA        SET UP FOR POSSIBLE RE-RECEPTION
              JMP     GAP
DEND          MOV     R2,#ENDCHR
              JMP     ACKNAK
BSY           CALL    GETCHR
              JC      BSY
              MOV     R2,#BSYCHR
              JMP     ACKNAK
PUTCHR        JT1     $+4
              JMP     PUTCHR          WAIT ON LAST CHAR
              MOV     A,R2
              MOVX    @R1,A           OUTPUT WITHOUT BUS LATCH
              RET
GETCHR        MOV     R1,#TIMEO       TIMEOUT ON CHARS
              CLR     C
GETCHR1       JT0     GETCHR2         INPUT CHAR FROM LINK
              DJNZ    R1,GETCHR1
              CPL     C
              RET
GETCHR2       IN      A,BUS
              RET
RDATA         MOV     R2,#15          TIMEOUT COUNT FOR LAST CHAR
RDTIM         JT0     RGOT
              DJNZ    R2,RDTIM
              RET
RGOT          IN      A,BUS           READ CHAR
              MOV     @R0,A           SAVE IN BUFFER
              INC     R0              BUMP BUFFER POINTER
              XRL     A,R4            LRC CALC
              MOV     R4,A
              IN      A,BUS           HASH CALC
              ADD     A,R5
              MOV     R5,A
              INC     R0              COUNT BYTE
              JMP     RDATA
*             DATE WRITTEN:   8/28/79
*             V2.0
*             DETECT LOW PAPER AND COVER OPEN
*             6/06/80          POWER UP RESET MESSAGE IMPLEMENTED
SUB           MACRO   AC,VAL
              CPL     AC
              ADD     AC,VAL
              CPL     AC
              ENDM                    POWER UP RESET MESSAGE IN ADDRESS
DVRADR        EQU     7EH
```

```
ACKCHR   EQU   78H
NAKCHR   EQU   19H
ENDCHR   EQU   55H
BSYCHR   EQU   2CH
CLOSEL   EQU   55H
STCHR    EQU   5EH              START CHAR
BUFA     EQU   14H              COMMAND INPUT/COMMAND END BUFFER
MAXNAK   EQU   255
GAPREC   EQU   98               TIMEOUT FOR GAP
GAPSND   EQU   90               ADDITIONAL TIME IN PROTOCOL FOR SENDING
TIME0    EQU   40               TIMEOUT 0 FOR PROTOCOL
TIME1    EQU   100
*
START    ANL   P2,#7FH          CLOSE LINK (POWER UP OPENS IT)
         CALL  PUTEST
         CPL   F0               SET UP POWERUP RESET MESSAGE
         MOV   R7,#1
         MOV   R0,#BUFA
         MOV   @R0,#OVRADR
         JMP   GAP
SETNAK   MOV   R7,#MAXNAK
GAP
         IN    A,P2             ALINE DEVICE ADDRESS
         ORL   A,#80H           ONLY LOW 7 BITS OF ADDRESS WERE SET
         MOV   R3,A                SAVE ADDRESS
         MOV   R0,#BUFA            INPUT BUFFER POINTER
GAPST    MOV   R2,#GAPREC          GAP TIME
GAPT     JT0   GAPC             TIME OUT PAST ALL CHARS
         DJNZ  R2,GAPT
         JMP   GAPD
GAPC     IN    A,BUS            IGNORE CHAR
         JMP   GAPST
GAPD     JF0   BREAK            SEND DONE
         IN    A,P1             PRINTER TEST BUTTON PRESSED?
         JB6   GAPCL
         JMP   /TEST
GAPCL    CALL  GETCHR
         JC    GAPD
         XRL   A,#CLOSEL
         JNZ   GAP              IF NOT CLOSE LINK REQUEST THEN INGNORE
         ANL   P2,#7FH          CLOSE LINK
RCHR     CALL  GETCHR           GET THE CHAR SENT. LOOK FOR START CHAR
         JC    RCHR
         XRL   A,#STCHR
         JNZ   RCHR             NO, THEN BID IS NOT OVER
         CALL  GETCHR           THIS DEVICE ADDRESSED?
         XRL   A,R3
         JNZ   GAP
         CALL  GETCHR           REDUNDANT ADDRESS CHAR
         XRL   A,R3
         JNZ   GAP
         JF0   BSY              SEND BSY IF LAST COMMAND NOT DONE
         MOV   R4,#0            CLEAR LRC,HASH
         MOV   R5,A
         MOV   R2,A             AND SEND ADDRESS
         CALL  PUTCHR
         MOV   R2,#0            STATUS BYTE
         CALL  PUTCHR
         DJNZ  R1,TDLOOP
         JMP   TDDONE
TDLOOP   INC   R0               SEND THE REST OF THE CHARS
         MOV   A,@R0            GET CHAR TO SEND
         MOV   R2,A
         CALL  PUTCHR           SEND IT
         XRL   A,R4             LRC IT
         MOV   R4,A
         MOV   A,R5             HASH
         ADD   A,@R0
         MOV   R5,A
         DJNZ  R1,TDLOOP        DATA COUNTER
TDDONE   MOV   A,R4             SEND LRC
         MOV   R2,A
         CALL  PUTCHR
```

```
            MOV     A,R5            SEND HASH
            MOV     R2,A
            CALL    PUTCHR
TOMPII      MOV     R1,#10          DELAY FOR UART(ASSUMES 1 LINK TIME USED ALREADY)
            IN      A,BUS
TOMPUT      JT1     TOMPII
            DJNZ    R1,TOMPUT
            MOV     R1,#TIME1       WAIT FOR RESPONSE
TRES        JT1     RAKNAK
            DJNZ    R1,TRES
            JMP     RNAK            TIMEOUT ON DEVICE
RAKNAK      MOV     R0,#BUFA             INPUT BUFFER
            IN      A,BUS
            XRL     A,#STCHR        HAS TO BE A START CHAR
            JNZ     SRET
            ANL     P2,#7FH         CLOSE LINK TO LET REPONSE GO AROUND
            CALL    RDATA
            DEC     R0              TEST TWO CHARS
            MOV     R1,#2           TEST EACH CHAR
RCHK        MOV     A,@R0
            XRL     A,#ACKCHR
            JZ      RACK
            MOV     A,@R0
            XRL     A,#BSYCHR
            JZ      RACK
            MOV     A,@R0
            XRL     A,#NAKCHR
            JZ      RNAK
            DEC     R0              POINT AT NEXT CHAR
            DJNZ    R1,RCHK
RNAK        IN      A,BUS           MAKE SURE UART IS CLEAR AFTER TESTING LINK
            DJNZ    R7,SRET         TRY MAXNAKS TIMES
RACK        MOV     R0,#SAVBA       NO KEY WANTED AND NONE TO SEND
            MOV     A,@R0
            MOV     R0,A
            MOV     @R0,#0
SRET        RET
            TITLE   'ALINE PRINTER CONTROLLER V2.0'
*
*           ALINE 26 OR 40 COLUMN CHARACTER PRINTER. USES LINKLESS
*           PROTOCOL
*           AUTHOR JOE KUBLER
            ORL     P2,#40H         SELECT STATUS
            IN      A,BUS
            JB0     XKEY
            ORL     P1,#060H        GO RECEIVE

ANL     P1,#0DFH             SELECT UART
            JMP     READ
TREDO       MOV     R1,#KEYBUF      ADDRESS OF REPEAT DATA
            JMP     BREAK           DON'T READ KEY
XKEY        ANL     P2,#03FH        READ KEY
            IN      A,BUS
            MOV     R1,#KEYBUF+3    SAVE THE KEY
            MOV     @R1,A
            MOV     R1,#KEYBUF+4    GET KEY LOCK STATUS
            CALL    KLOCK1
            CPL     F1              INDICATE KEY IS NOT YET SENT
            MOV     R1,#KEYBUF
BREAK       ORL     P1,#060H        SELECT UART
            ANL     P1,#0DFH
            JT1     READ            MAKE SURE NO CHAR HAS COME WHILE TESTING KB
            ORL     P2,#80H         BREAK LINK
            MOV     R2,#GAPSND      NOW WAIT ADDITIONAL 2 MSEC FOR SENDING
            INC     R3              SET R3 TO KEYBOARD ADDRESS (DEVADR+1)
BRKSND      JT1     READ            SEE IF ANYONE STILL SENDING OR BEAT US HERE
            DJNZ    R2,BRKSND
BID         MOV     R2,#CLOSED      BID FOR LINK. MUST OPEN ALL CLOSED DEVICES
            CALL    PUTCHR
            MOV     A,R3                 AND MAKE SURE WE ARE ONLY SENDERS
            MOV     R2,A
```

```
             CALL    PUTCHR
             CALL    GETCHR
BRKG         JC      GAP               WAIT FOR NEXT GAP
             XRL     A,#CLOSEL
             JNZ     GAP
             CALL    GETCHR
             JC      GAP               ERROR, CHAR DID NOT COME
             CPL     A                 SUBTRACT A FROM R3 (RECEIVED FROM OUR ADDR)
             INC     A
             ADD     A,R3
             JB7     BIDDLY            OUR ID IS LOWER SO REBID
             JNZ     GOTCL1            WE WON
             JMP     TBWON             CONFLICT, IE SOMEONE ELSE IS WAITING FOR US
BIDDLY       MOV     R2,#20            WAIT FOR LINKS TO BE CLOSED BEFORE REBID
             DJNZ    R2,S
             JMP     BID
TBWON        CALL    TSEND
             ORL     P2,#80H           MAKE SURE LINK IS OPEN
             JMP     SETNAK
TSEND        ORL     P2,#80H           BREAK LINK FOR RESPONSE
             MOV     A,R1              SET UP TO SEND PROPER RESPONSE
             MOV     R0,#SAVBA
             MOV     @R0,A
             MOV     R0,A
             MOV     A,@R0
             MOV     R1,A              GOT BUFFER IN R0 AND COUNT IN R1
             INC     R0
             MOV     R2,#STCHR         START CHAR
             CALL    PUTCHR
             MOV     A,@R0             TO ADDRESS
             MOV     R2,A
             CALL    PUTCHR
             CALL    PUTCHR            REDUNDANT
             INC     R0
             MOV     A,@R0             INIT LRC,HASH WITH FROM ADDRESS
GAPD         MOV     R1,#CDISP         SEE IF ANY DATA TO SEND
             MOV     A,@R1             CUSTOMER DISPLAY ?
             JNZ     BREAK
             MOV     R1,#KEYBUF        KEY

MOV     A,@R1
             JNZ     TRANS
READ         CALL    GETCHR
             JC      GAPD
             XRL     A,#CLOSEL         REQUEST TO CLOSE LINK
             JNZ     GAP
GOTCL1       ANL     P2,#7FH           CLOSE LINK
RCHR         CALL    GETCHR            GET THE CHAR SENT. LOOK FOR START CHAR
             XRL     A,#STCHR
             JNZ     RCHR              NO, THEN BID IS NOT OVER
             CALL    GETCHR            THIS DEVICE ADDRESSED?
             MOV     R5,A              SAVE TO VERIFY THAT DEVADR OR DEVADR+1 ADDRESSED
             ANL     A,#0FEH
             XRL     A,R3
             JNZ     GAP
             CALL    GETCHR            REDUNDANT ADDRESS CHAR
             XRL     A,R5
             JNZ     GAP
             MOV     A,R5              SAVE DEVICE ADDRESS THAT WAS ADDRESSED
             MOV     R3,A
             MOV     R4,#0             CLEAR LRC,HASH
             MOV     R5,#0
             CALL    RDATA             READ IN THE DATA AT R0
RDONE        DEC     R0                CHECK LRC. CALC(LRC) = REC(HASH)
             MOV     A,@R0
             XRL     A,R4
             JNZ     NAK               BAD LRC
             DEC     R0                FIX HASH. CALC(HASH)=HASH+REC(LRC)+REC(HASH)
             MOV     A,R5
             SUB     A,@R0
             INC     R0
```

```
              SUB       A,@R0
              XRL       A,@R0
              JNZ       NAK
              JMP       COMMAND
NAK           MOV       R2,#NAKCHR      NAK SENDER
              CALL      ACKNAK
              JMP       GAP
DEND          MOV       R2,#ENDCHR
              JMP       ACKNAK
BUSY          MOV       R2,#BSYCHR      SEND BUSY TO SENDER
              CALL      ACKNAK
              JMP       SETNAK
RDATA         MOV       R2,#10          TIMEOUT COUNT FOR LAST CHAR
RDTIM         JT1       RGOT            MESSAGE CHAR
              DJNZ      R2,RDTIM
              RET
RGOT          IN        A,BUS           READ CHAR
              MOV       @R0,A           SAVE IN BUFFER
              XRL       A,R4            LRC CALC
              MOV       R4,A
              MOV       A,@R0
              ADD       A,R5
              MOV       R5,A
              INC       R0              BUMP BUFFER POINTER
              JMP       RDATA
TRANS         JF1       TREDO           OTHERWISE SEE IF KEY IS ALREADY READ
              ORL       P1,#060H        SELECT KEY STATUS
              ANL       P1,#0BFH
SUB           MACRO     AC,VAL
              CPL       AC
              ADD       AC,VAL
              CPL       AC

ENDM
DVRADR        EQU       7EH             POWER UP RESET MESSAGE TO ADDRESS
ACKCHR        EQU       78H
NAKCHR        EQU       19H
ENDCHR        EQU       55H
BSYCHR        EQU       2CH
CLOSEL        EQU       55H
STCHR         EQU       5EH             START CHAR
MAXNAK        EQU       255             MAXIMUM RETRIES OF MESSAGE/RESPONSE
GAPREC        EQU       94              TIMEOUT FOR GAP IN PROTOCOL
GAPSND        EQU       90              EXTRA TIME BEFORE PROTOCOL ALLOWS SENDING
TIME1         EQU       112             TIMEOUT1
TIME0         EQU       25              TIMEOUT0
CDTSP         EQU       49              CUSTOMER DISPLAY BUFF AT MID STACK
KEYBUF        EQU       CDTSP+4         KEYRETURN BUFFER NEEDS 3 BYTES
SAVBA         EQU       KEYBUF+6
BUFA          EQU       29              INPUT BUFFER ADDRESS
KOTIM         EQU       140             MAXIMUM TIME TO WAIT FOR EMPTYING KEY BUFFER
CDOFF         EQU       0F7H
CDON          EQU       8
              ANL       P2,#7FH         CLOSE LINK
              ENTO      CLK
              CALL      INIT            INIT DISPLAY
              JMP       BEGIN
              ORG       7
              DJNZ      R6,TRET
              ORL       P1,#2           TURN OFF CASH DRAW SOLENOID
              STOP      TCNT
TRET          RETR
BEGIN         MOV       R0,#CDTSP
              MOV       @R0,#0
              CPL       F1              SEND POWER UP RESET MESSAGE
              MOV       R0,#KEYBUF
              MOV       @R0,#1
              INC       R0
              MOV       @R0,#DVRADR
              INC       R0
              ANL       P1,#7FH
```

```
            IN      A,BUS
            ORL     A,#1
            MOV     @R0,A
            MOV     R7,#1           ONLY 1 TRY ON THIS MESSAGE
            JMP     GAP
SETNAK      MOV     R7,#MAXNAK
GAP         ORL     P1,#0F1H
            ORL     P2,#07FH        GET ALINE ADDRESS
            ANL     P1,#7FH
            IN      A,BUS           ALINE ADDRESS
            ANL     A,#0FEH         IGNORE LOW BIT
            MOV     R3,A            SAVE ADDRESS
            ORL     P1,#80H         DESELECT ADDRESS
            ANL     P1,#0DFH        SELECT UART
            MOV     R0,#BUFA        INPUT BUFFER POINTER
GAPST       MOV     R2,#GAPREC      FIRST PART OF 2 MSEC GAP WAITED OUT HERE
GAPT        JT1     GAPC            TIME OUT PAST ALL CHARS
            DJNZ    R2,GAPT
            JMP     GAPD
GAPC        IN      A,BUS           IGNORE CHAR
            JMP     GAPST
            LD      A,H
            OR      L
            EX      (SP),HL
            JR      NZ,READNXT

CALL    GETCHR          SHOULD BE NO MORE CHARS
            JR      Z,READONE
READCLR     CALL    CLRUART
READBAD     POP     HL              REMOVE CHAR COUNT FROM STACK FOR RETURN
            POP     HL              REMOVE DEVICE STATUS FROM STACK AND DISCARD
READBAD1    LD      D,2**DBADD      BAD DATA RECEIVED
            RET
*
*           UTILITY I/O ROUTINES USED IN VARIOUS LOCATIONS ABOVE
PUTCHR      PUSH    AF              OUTPUT CHAR IN A TO LINK
            IN      A,(LINKST)
            AND     LNKORD
            JR      Z,PUTCHR+1
            POP     AF
            OUT     (LINK),A
            RET
TIMEO       LD      B,TIMDLY        TIMEOUTO WAITING FOR A CHAR ONLINK
            JP      GETCHR+2
GETCHR      LD      B,CHRDLY-1      GET A CHAR FROM LINK OR TIMEOUT IF NONE (Z SET)
            IN      A,(LINKST)
            AND     LNKIRD
            JR      NZ,GETCH1
            DJNZ    GETCHR+2
            RET
GETCH1      IN      A,(LINK)
            RET
SNDANE      LD      A,(IOCTL)       OPEN LINK FOR SENDING RESPONSE
            SET     BRKLNK,A
            OUT     (LNKCTL),A
            LD      A,SICHR         SEND SHORT RESPONSE (ACK/NAK/END DEPENDING ON B)
            CALL    PUTCHR
            LD      A,B
            CALL    PUTCHR
            CALL    PUTCHR          RETURN FROM PUTCHR RETURNS FROM SNDANE
            LD      B,34            WAIT FOR CHARS TO COMPLETE TO CLOSE LINK
            DJNZ    S
            LD      A,(IOCTL)
            OUT     (LNKCTL),A
            RET
*
*           CODE FOR CRT CONTROLLER FOLLOWS
*
*
*
```

```
        TITLE   'ALINE CONSOLE CONTROLLER V2.1'
*
*       ALINE CONSOLE CONTROLLER NEW PROTOCOL
*       AUTHOR JOE KUBLER
*
*       HISTORY
*
*       MAR 31,1980     CUSTOMER DISPLAY ADDED
* V2.0  ADD POWER UP RESET MESSAGE
*
* V2.1  CHANGE CUSTOMER DISP TO BE NON-INTERRUPT DRIVEN BECAUSE OF
*       TIMING PROBLEMS WITH LINK PROTOCOL
*
*       FLAG 1 INDICATES THAT A KEY HAS BEEN READ BUT NOT SENT .
*
        CALL    SNDANK
        JP      WAITGAP
*
*       READ THE DATA COMING IN FROM LINK USING BUFFER IN DSB POINTED TO BY
*       IX REG. SET FLAGS IN DSB ACCORDING TO 'CORRECTNESS' OF DATA (LRC/HASH)
READLNK  LD     B,CHRDLY         TIMEOUT ON CHAR IF NONE COME
         IN     A,(LTNKST)
         AND    LNKIRD
         JP     NZ,READDS        A CHAR CAME (DEVICE STATUS OR COMMAND )
         DJNZ   READLNK+2
         JP     READBAD          NO CHAR CAME AND IT SHOULD HAVE
READDS   IN     A,(LTNK)
READDTA  PUSH   AF               SAVE DEVICE STATUS TILL WE ARE SURE OF GOOD REC
         LD     D,(IX+TNBUFA)    GET INPUT BUFFER ADDRESS
         LD     E,(IX+TNBUFA+1)
         LD     B,(IX+TNBUFL)    GET BUFFER MAX LENGTH
         LD     C,(IX+TNBUFL+1)
         LD     H,A              START LRC,HASH
         LD     L,A              NOTE THAT 'FROM' ADDRESS NEEDS TO BE INCLUDED
         PUSH   BC               SAVE LENGTH
READNXT  LD     B,CHRDLY         GET NEXT CHAR UNTIL DONE
         IN     A,(LTNKST)
         AND    LNKIRD
         JP     NZ,READGTT
         DJNZ   READNXT+2        NO CHAR OR TIMEOUT YET
READONE  EX     DE,HL
         LD     B,(IX+DEVICE)    INCORPORATE 'FROM' ADDRESS IN LRC/HASH
         LD     A,D
         XOR    B
         LD     D,A
         DEC    HL               CALC(LRC)=INPUT(HASH)
         CP     (HL)
         JP     NZ,READBAD       NO MATCH MEANS BAD DATA
         LD     A,E
         ADD    A,B
         SUB    D                INPUT(HASH)=CALC(LRC), REPLACE SUB(HL)
         DEC    HL               INPUT(HASH)=CALC(HASH)-INPUT(HASH)-INPUT(LRC)
         SUB    (HL)
         CP     D
         JP     NZ,READBAD
         POP    DE               FIND THE INPUT LENGTH
         INC    DE               DELETE COUNT OF LRC/HASH
         INC    DE
         LD     H,(IX+TNBUFL)
         LD     L,(IX+TNBUFL+1)
         XOR    A                CLEAR CARRY
         SBC    HL,DE
         LD     (IX+INRECL),H
         LD     (IX+INRECL+1),L  SAVE THE INPUT LENGTH IN DSB INPUT LENGTH
         LD     D,2**DPI         DATA IS GOOD, CLEAR STATUS BITS
         POP    AF               GET DEVICE STATUS FROM STACK AND INTO DSB
         LD     (IX+DEVSTA),A
         RET
```

```
READGOT  IN    A,(LINK)           READ THE CHAR
         LD    (DE),A             SAVE IT IN BUFFER
         XOR   H                  LRC
         LD    H,A
         LD    A,(DE)
         ADD   A,L                HASH
         LD    L,A
         INC   DE
         EX    (SP),HL            DEC INPUT COUNT
         DEC   HL
         CALL  GETCHR
         JP    Z,WAITGAP          IF NO CHAR CAME THEN IGNORE
         LD    D,0                INDICATE NOT POWERUP DEVICE (YET)
         CP    C

JR    Z,RECRFD           IF TO US CHECK REDUNDANT ADDRESS
         CP    DVRADR             ELSE SEE IF POWERUP MESSAGE. (TO COMPLETE DSB)
         JP    NZ,WAITGAP
         LD    C,DVRADR
         LD    D,2**DPUP
RECRED   CALL  GETCHR
         JP    Z,WAITGAP
         CP    C                  (REDUNDANT 'TO' ADDRESS)
         JP    NZ,WAITGAP
         CALL  GETCHR             GET FROM ADDRESS
         LD    C,A                SAVE IN CASE NEEDED FOR 'UNKNOWN' DSB
         ADD   A,A                SEE IF SENDER HAS DSB IN DEVICE ACTIVITY LIST
         LD    H,DEVTAB/256       DEVICE ACT. TAB. IS ON 256 BYTE BOUNDARY
         LD    L,A
         LD    A,(HL)
         OR    A
         JP    NZ,RECRED          GET DSBPTR
         BIT   DPUP,D             SEE IF POWERUP MESSAGE. IF SO IGNORE
         JP    NZ,WAITGAP
         LD    HL,IOCTL           INDICATE UNKNOWN DSB RECEIVED
         SET   UNKREC,(HL)
         LD    HL,(DSBX)          GET 'UNKNOWN' DSBPTR AND CHECK IT
         LD    A,L
         OR    A                  'UNKNOWN' EXISTS?
         JP    Z,RECBSY           NOPE
         LD    L,H                REVERSE ORDER OF HL (ORIG. ORDER WAS NOT Z80)
         LD    H,A
         PUSH  HL
         INC   HL                 SAVE 'UNKNOWN' ADDRESS
         LD    (HL),C
         IN    A,(LINK)                NO NEED TO TEST STATUS BECAUSE OF DELAY
         JP    RECRDY                  BETWEEN CHARS CAUSED BY CODE
RECREQ   CALL  GETCHR             GET STATUS CHAR HERE TO PREVENT OVERRUN
         LD    B,(HL)             SEE IF DSB STATUS IS BUSY(COMMAND SENT)
         INC   HL
         LD    C,(HL)               AND NOT JUST WAITING TO SEND
         PUSH  BC                 GET DSB IN IX REG
RECRDY   POP   IX
         BIT   DPI,(IX+DSBSTA)
         JP    Z,RECBSY           NO COMMAND ISSUED SO IGNORE
         BIT   DPUP,D
         JP    NZ,RECXIT
         CALL  READDTA            READ MESSAGE THAT COMES IN
         BIT   DBADD,D            WAS DATA BAD (LRC/HASH INCORRECT)
         JR    NZ,RECNAK          NAK IF IT WAS
         LD    B,ACKCHR           ELSE ACK
         CALL  SNDANE
RECXIT   LD    (IX+DSBSTA),D      SET STATUS BEFORE DSB REMOVAL
         CALL  REMDSB             SINCE DSB IS SATISFIED, REMOVE IT FROM ACTIVITY
         JP    WAITGAP               LIST
RECNAK   LD    B,NAKCHR
         CALL  SNDANE
         DEC   (IX+DSBNAK)        TOO MANY NAKS SENT
         JP    Z,RECXIT
         JP    EXITIO2
```

```
RECBSY  BIT     DPUP,D
        JP      NZ,WAITGAP
        CALL    CLRUART
        LD      A,BSYCHR        BUSY CHAR
        RET     Z               IF ZERO THEN INT ADR NOT SET
        LD      DE,OSBLNK       POINT AT OSB LINK FOR INTERRUPT LINKED LIST
        ADD     IX,DE
        LD      HL,(INTHEAD)    IF INTHEAD=NUL THEN

LD      A,H
        OR      A
        JR      NZ,ADDTAIL
        LD      (INTHEAD),IX    INTHEAD = DSB
        LD      HL,INTLSW       INTERRPUT PENDING IS SET
        SET     0,(HL)
        JR      ADDONE
ADDTAIL PUSH    IX              ELSE
        POP     DE
        LD      HL,(INTAIL)
        LD      (HL),0
        INC     HL
        LD      (HL),E
ADDONE  LD      (INTAIL),IX     INTAIL=DSB
        LD      (IX+0),0
        RET
*
*       INSDSB PUTS A DSB IN READY TO SEND QUEUE LINKED THROUGH
*              THE INRECL FIELD OF DSB
*       NOTE THAT IF (DE)=0 THEN ROM LOCATION 0 IS ACCESSED BUT IT WILL
*       CAUSE A RETURN AS A 'C3' IS THERE AND THAT LOOKS LIKE DPI=1
INSDSB  LD      A,(DE)          SEE IF DPI BIT ALREADY SET IF SO
        BIT     DPI,A           NO NEED TO QUEUE FOR TRANSMISSION
        RET     NZ
        LD      HL,(NXTDSB)     SEE IF QUEUE EMPTY
        LD      BC,INRECL+1
        LD      A,H
        OR      A
        JP      NZ,INSLST       IF NOT ADD AT END ELSE ADD AT FRONT
        LD      (NXTDSB),DE
        LD      (LSTDSB),DE     AND REAR
        JP      INSZER
INSLST  LD      HL,(LSTDSB)     GET LAST DSB AND LINK TO NEW LAST
        ADD     HL,BC
        LD      (HL),D          STORE IN Z80 WORD ORDER
        DEC     HL
        LD      (HL),E
        LD      (LSTDSB),DE     SAVE NEW LAST POINTER
INSZER  LD      H,D             POINT NEW LAST DSBS INRECL TO NULL
        LD      L,E
        ADD     HL,BC
        LD      (HL),0          AGAIN Z80 ORDER
        RET
*
*       FIRST CHAR INT IMPLIES RECEIVING A MESSAGE/COMMAND FROM LINK
*          BECAUSE WE DID NOT HAVE ANYTHING TO SEND OR WE LOST BID FOR LINK
RECCLSL LD      A,B             SEE IF FIRST CHAR IS CLOSELINK CHAR
RECBRK  CP      CLOSEL          IF NOT THEN 'CHAR' MUST BE NOISE GLITCH
        JP      NZ,WAITGAP      SO IGNORE AND WAIT FOR ANOTHER GAP
RECCC   LD      A,(IDCTL)       INDICAT CLOSELINK CHAR WAS RECEIVED
        SET     RECSET,A
        RES     BRKLNK,A        MAKE SURE LINK IS CLOSED AND WAIT FOR INPUT
        JP      WAITGPS         NOW WAIT FOR DATA TO COME IN
RECSC   CALL    TIMEO           GET START CHAR
        JP      Z,INTRETE       TIMED OUT. SO IGNORE
RECEIVE CP      STCHR           START CHAR?
        JR      NZ,RECSC
        IN      A,(ALNADR)      SEE IF MESSAGE TO US. COMPARE TO OUR ADDRESS
        LD      C,A
        LD      D,A             BUFFER ADDRES AND LENGTH
        INC     HL
        LD      E,(HL)
        INC     HL
```

```
         LD      B,(HL)
         INC     HL
         LD      C,(HL)
         INC     HL
         EX      (SP),HL         PUT OBDPTR ON STACK/ GET LRC/HASH IN HL
         JP      SNDOCK          GO TEST IF ZERO CHARS TO SEND
SNDNXT   IN      A,(LTNKST)      SEND NEXT CHAR
         AND     LNKORD
         JR      Z,SNDNXT
         LD      A,(DE)
         OUT     (LTNK),A
         XOR     H               UPDATA LRC
         LD      H,A
         LD      A,(DE)          UPDATE HASH
         ADD     A,L
         LD      L,A
         INC     DE              NEXT BYTE
         DEC     BC              IS ALL OF THIS BUFFER SENT
SNDOCK   LD      A,B
         OR      C
         JR      NZ,SNDNXT
         EX      (SP),HL         YES, GET NEXT POINTER IN OBDPTR TO BUFFER
         JR      SNDBUF
SNDLRC   POP     HL              GET LRC/HASH FROM STACK
         LD      A,H             SEND LRC
         XOR     (IX+DSBCOM)        (INCLUDE COMMAND SENT)
         CALL    PUTCHR
         LD      A,L
         ADD     A,(IX+DSBCOM)      (INCLUDE COMMAND IN HASH ALSO)
         CALL    PUTCHR          SEND HASH
CLRUART  CALL    GETCHR          CLEAR ANY CHARS FROM TRANSMIT COMING AROUND
         JR      NZ,CLRUART
         RET
;
;        REMOVE DSB FROM DEVICE ACTIVITY LIST . IX POINTS AT IT
REMDSB   SET     DODNE,(IX+DSBSTA)   SET DONE FIRST
         RES     DPT,(IX+DSBSTA)     CLEAR DATA PENDING BIT
         LD      HL,INCTL            SEE IF UNKNOWN DSB WAS USED (DSBX)
         BIT     UNKREC,(HL)
         JR      Z,REM0
         LD      HL,DSBX             IT WAS
         JR      REM1
REM0     LD      H,DEVTAB/256    DEVTAB ON 256 BYTE BOUNDARY
         LD      L,(IX+DEVICE)
         SLA     L               2 BYTE WIDE VECTOR
REM1     LD      D,(IX+DSBLNK)   COPY DSBLNK TO DEVICE ACTIVITY LIST
         LD      (HL),D
         LD      A,D             NUL LINK ?
         OR      A
         JP      Z,REMINT
         INC     HL
         LD      E,(IX+DSBLNK+1)
         LD      (HL),E
         CALL    INSDSB          INSERT THIS NEW DSB ON READY TO SEND LIST.
                                 DE HOLDS ADDRESS AS IS REQUIRED
;        IF INTERRUPT ADDRESS IS SET IN DSB THEN PUT DSB ON NUL INTERRUPT LIST
;        NOTE THAT IX IS DESTROYED. (NO LONGER POINTS AT FRONT OF DSB)
REMINT   LD      A,(IX+INTADR)
         OR      A
DACK     LD      A,ACKCHR
         CALL    SNDANE
         JP      EXITIO

;        READ RESPONSE TO COMMAND FROM LINK
DRES0
         CALL    GETCHR
DRES     LD      C,A             SAVE CHAR FOR TESTING
         CP      STCHR           IF CHAR IS ZERO THEN IT IS START SO SKIP IT
         JP      Z,RDRES0
         CP      80H             80H AND ABOVE ARE ADDRESSES
```

```
              JP      P,RDMES
              CALL    GETCHR
              CP      ROH
              JP      P,RDMES         REDUNDANT CHAR SHOWS ERROR
              LD      B,2             SEE IF ACK/NAK/END
RDTYP         CP      ACKCHR
              JR      NZ,RDNAK
              LD      D,2**DACK
              RET
RDNAK         CP      NAKCHR
              JR      NZ,RDEND
              LD      D,2**DNAK
              RET
RDEND         CP      ENDCHR          \
              JR      NZ,RDBSY
              LD      D,2**DDEND
              LD      (IX+DEVSTA),0   NO ERROR FROM DEVICE
              RET
RDBSY         CP      BSYCHR          DEVICE BUSY RESPONSE ?
              JP      NZ,RDNXT
              LD      D,2**DBUSY
              RET
RDNXT         LD      A,C
              DJNZ    RDTYP
              LD      D,2**DNAK       IF NONE OF ABOVE ASSUME IT WAS A NAK
              RET
RDMES         CALL    GETCHR          GET SECOND 'TO' ADDRESS
              CALL    GETCHR          GET FROM ADDRESS
              CALL    READLNK         READ DATA
              RET
*             SEND COMMAND MESSAGE TO LINK
SENDM         SET     DPI,(IX+DSBSTA) INDICATE DSB WILL BE READY TO RECEIVE
              LD      H,(IX+DBDPTR)   OUTPUT BUFFER DESCRIPTOR ADDRESS
              LD      L,(IX+DBDPTR+1)
              LD      A,STCHR         SEND START CHAR
              CALL    PUTCHR
              LD      A,(IX+DEVICE)   'TO' ADDRESS
              CALL    PUTCHR
              CALL    PUTCHR
              IN      A,(ALNADR)      SEND 'FROM' ADDRESS
              LD      B,A             START LRC/HASH
              LD      C,A
              CALL    PUTCHR
              LD      A,(IX+DSBCOM)   SEND COMMAND
              CALL    PUTCHR
              PUSH    BC              SAVE LRC/HASH ON STACK
              LD      A,H
              OR      A               SEE IF OUTPUT BUFFER TO SEND OR SKIP ONLY
              JP      Z,SNDLRC
SNDBUF        LD      A,(HL)          SEND NEXT OUTPUT BUFFER IF ANY (IE <>0)
              OR      A
              JP      Z,SNDLRC        IF NONE SEND LRC/HASH
              LD      A,(IOCTL)       SET IOCTL TO ALLOW TIMEOUT1 AND FCHR
              OR      2**II4CHK
              OUT     (LNKCTL),A
              LD      (IOCTL),A

INTRETF       POP     IX              RETURN FROM INT WITH FIRST CHAR INT ENABLED
              EXX
              EX      AF,AF'
              EI
              RET
*
TIMOUT1       EXX                     SAVE BANK
              PUSH    IX              AND INDEX
              LD      IX,(SNDDSB)     DSB THAT WAS TIMED OUT
              SET     DITM,(IX+DSBSTA)        INDICATE TIMEOUT IN DSB STATUS
              LD      HL,NAKS         BUMP NAK COUNT
              DEC     (HL)
              JP      NZ,EXITIO2              IF NOT RETRY MESSAGE/COMMAND
EXITIO        CALL    REMDSB          IF SO THEN FINISH I/O ON DSB
```

```
EXITIO1  LD    HL,NAKS              ZERO NAKS TO INDICATE DONE SENDING DSB
         LD    (HL),0
EXITIO2  LD    A,(IOCTL)
         AND   2**ERRLCK+2**BRKLNK   CLEAR ALL BITS EXCEPT ERROR LOCKOUT
         OR    2**FCHREN            NEXT CHAR IN SHOULD BE A BID, SO WE WAIT
                                    ; FOR IT SO WE CAN CLOSE LINK (IN RECEIVE)
         JP    WAITGPS
*
*        RESPONSE COMING IN FROM COMMAND
RESPNS   LD    IX,(SNDDSB)
         LD    A,(IOCTL)            CLOSE LINK SO RESPONSE CAN GO AROUND
         RES   BRKLNK,A
         OUT   (LNKCTL),A
         LD    A,B                  GET INPUT CHAR
         CALL  RDRES
         LD    A,(IOCTL)            OPEN LINK AGAIN
         OUT   (LNKCTL),A
         LD    A,D                  GET RESPONSE STATUS
         OR    (IX+DSBSTA)          UPDATE TEMPORARY STATUS
         LD    (IX+DSBSTA),A
         BIT   DACK,D               ACK?
         JP    Z,RNAK
RESOK1   LD    A,(IX+INBUFL)        SEE IF THIS IS ALL THAT WAS EXPECTED
         OR    (IX+INBUFL+1)         (IE EXPECTED INPUT LENGTH=0)
         JP    Z,EXITIO             IF SO THEN END THIS DSB
         JP    EXITIO1              ELSE WAIT FOR 'DONE' FROM OTHER DEVICE
RNAK     BIT   DNAK,D               NAK?
         JP    Z,RBSY
RNAK1    LD    HL,NAKS              UPDATE NAK COUNT
         DEC   (HL)
         JP    Z,EXITIO             TOO MANY NAKS ?
         JP    EXITIO2              RETRY XMISSIONS
RBSY     BIT   DBUSY,D              DEVICE BUSY
         JP    Z,REND
         LD    A,(IX+DSBSTA)        SEE MIS-COMMUN. CAUSED NAK OR TIMEOUT
         AND   2**DNAK
         JR    NZ,RESOK1            THEN WE ASSUME AN ACK WAS GOOFED UP
         JP    RNAK1                ELSE DEVICE IS BUSY RETRY
REND     BIT   DDEND,D              END ?
         JP    NZ,EXITIO            IF NOT A DEVICE END SEE IF DATA WAS GOOD
         BIT   DBADD,D              BAD DATA?
         JR    Z,RDACK              NO SO WE RECEIVED DATA, ACK IT
         LD    B,NAKCHR             NAK BAD DATA
         CALL  SNDANE
         JP    EXITIO1
         BIT   GAPCK,A              PROTOCOL GAP?
         JP    NZ,GAP
         OR    2**GAPCK+2**FCHREN   NEXT GAP IS PROTOCOL GAP.
         LD    (IOCTL),A

OUT   (LNKCTL),A
         IN    A,(LTNK)             MAKE SURE ANY LEFTOVER CHAR IS CLEARED
APEX     EX    AF,AF'
         EI
         RET
AP       EXX                        FINISH SWAPPING BANKS
         PUSH  IX                   AND SAVE IX REG
         LD    B,A                  SAVE IOCTL STATUS
         LD    HL,NAKS              SEE IF LAST DSB DONE OR IF THERE IS ANOTHER TO
         LD    A,(HL)
         INC   HL
         INC   HL
         OR    (HL)                 SEND (NXTDSB NOT NULL)
         JP    Z,INTRETE
         IN    A,(LINKST)           MAKE SURE NOONE SENT CHAR ALREADY
         AND   LNKIRD
         JP    NZ,BTDLST
         SET   BRKLNK,B             BREAK THE LINK TO BID
         LD    A,B
         OUT   (LNKCTL),A
         LD    (IOCTL),A
```

```
           IN      A,(LTNKST)      DID SOMEONE GET LINK BEFORE US?
           AND     LNKIRD
           JP      Z,BID
BIDLST     IN      A,(LTNK)
           JP      RECBRK          TEST IF CHAR WAS CLOSE LINK CHAR
BID        LD      A,CLOSEL        REQUEST CURRENT LINK 'CONTROLLER' TO CLOSE
           CALL    PUTCHR
           IN      A,(ALNADR)      AND SEND BID TO MAKE SURE WE ARE ONLY SENDER
           LD      E,A
           CALL    PUTCHR
BID1       CALL    TIMEO
           JP      Z,WATFGAP       IF NO RESPONSE THEN LINK IS OPEN YET SO WAIT
           CP      CLOSEL          MAKE SURE CHAR IS A CLOSE CHAR
           JP      NZ,BID1
           CALL    TIMEO           SEE IF WE WON BID BUT DON'T WAIT FOREVER
           JP      Z,WATFGAP
           CP      E               WHAT ADDRESS CAME IN
           JP      M,RECCC         LOST BID . CLOSE LINK AND WAIT FOR START CHAR
           JP      Z,BID2          WON BID SO SEND DATA
           LD      B,16            DELAY BEFORE REBIDDING
           DJNZ    $
           JP      BID
BID2       LD      HL,NAKS         SEE IF NEW DSB TO SEND
           LD      A,(HL)
           OR      A
           JP      Z,BID3
           LD      IX,(SNDDSB)
           JP      BID4
BID3       LD      IX,(NXTDSB)     GET DSB TO SEND AND SAVE
           LD      (SNDDSB),IX
           LD      A,(IX+TNRECL)   UPDATE TRANSMIT QUEUE
           DEC     (HL)            SET NAKS TO SEND CORRECT NUMBER OF TIMES
           INC     HL              POINT PAST 'NAKS' TO NXTDSB
           LD      (HL),A          SAVE UPDATED NXTDSB POINTER
           INC     HL
           LD      A,(IX+TNRECL+1)
           LD      (HL),A
BID4       CALL    SENDM
           CP      (HL)
           JP      NZ,NMIME
           INC     HL
           CP      (HL)

JP      NZ,NMIME
WARMR      INC     HL
           LD      A,(HL)          GET ADDRESS FROM VECTOR
           INC     HL
           LD      L,(HL)          IN NMI ORDER
           LD      H,A
           LD      SP,STACK
           PUSH    HL              SAVE ADDRESS FOR RESTART
           POP     IX              NOW SAVE APPS START ADDRESS
WARM0      LD      BC,WARMDB       DEBOUNCE RESTART BUTTON
WARM1      IN      A,(NMISTA)
           BIT     WARMST,A
           JP      Z,WARM0
           DEC     BC
           LD      A,B
           OR      C
           JP      NZ,WARM1
           LD      HL,WARM2        GET OUT OF NMI MODE
           PUSH    HL
           RETN
WARM2      LD      BC,1F8H         ZERO DEVICE TAB AND OTHER IO AREAS
           LD      HL,DEVTAB
           LD      DE,DEVTAB+1
           LD      (HL),0
           LDIR
           LD      A,2**ERRLCK+2**BRKLNK   SET UP LINK CONTROL PORT
           LD      (IOCTL),A
           LD      (LNKCTL),A
```

```
        IN      A,(LTNK)         RESET UART INPUT
        CALL    PWRUP            SEND POWERUP MESSAGE
        EI
        PUSH    IX               SET UP APPS FOR INTERPRETER
        JP      ZINT
*
FCHR    LD      B,A              SAVE CHAR FOR TESTING FOR CLOSE LINK REQUEST
        PUSH    IX               SAVE INDEX REGISTER IX
        LD      A,(IOCTL)
        BIT     TIMCHK,A         WAITING FOR TIMEOUT SO THIS IS RESPONSE
        JP      NZ,RESPNS
        BIT     RECSET,A         SEE IF CLOSEL COMMAND WAS RECEIVED SO DATA COMES
        LD      A,B              GET FIRST READ CHAR BACK FOR RESPONSE TEST
        JP      NZ,RECEIVE
        JP      RECCLSL          MESSAGE TO RECEIVE
WAITGAP LD      A,(IOCTL)        SET UP TO WAIT FOR NEXT GAP
        AND     2**BRKLNK+2**ERRLCK      LEAVE ERROR LOCKOUT AS IT WAS
WAITGPS LD      (IOCTL),A
        OUT     (LNKCTL),A
        EXX                      SWAP REG BANKS BACK
        EX      AF,AF'
        POP     IX
        EI
        RET
*       GAP INT
GAPINT
        LD      A,(IOCTL)
        BIT     RECSET,A         ARE WE WAITING FOR BIDDING TO END?
        JP      NZ,GAPEX
        BIT     TIMCHK,A         TIMEOUT1 OCCUR?
        JP      NZ,TIMOUT1
        ORG     8                GAP
        EX      AF,AF'
        OUT     (RESGAP),A       CLEAR GAP INT
        JP      GAPINT

ORG     8*2              BOTH GAP AND FIRST CHAR. TREAT AS GAP INT
        JP      18H
        JP      SVC2IO                   ;ENTRY FOR SVC2
        ORG     8*3              GAP AGAIN
        EX      AF,AF'
        OUT     (RESGAP),A
        JP      GAPINT
        ORG     8*4              DATA READY
        EX      AF,AF'           SAVE REGS
        IN      A,(LTNK)         CLEAR FIRST CHAR (CAN ALWAYS IGNORE THIS CHAR)
        EXX                      SAVE REST OF REGS
        JP      FCHR
        ORG     8*5              DIAGNOSTIC BOARD INTERRUPT
        JP      ZBUGINT
        ORG     8*6              DATA READY AGAIN
        EX      AF,AF'           SAVE REGS
        IN      A,(LTNK)         CLEAR FIRST CHAR (CAN ALWAYS IGNORE THIS CHAR)
        EXX                      SAVE REST OF REGS
        JP      FCHR
        ORG     8*7
        EI
        RET
*       MEMORY ERROR NONMASKABLE INT.
        ORG     66H              MEMORY ERROR INTERRUPT
        PUSH    AF
        PUSH    HL
        LD      H,0
NMI0    IN      A,(NMISTA)       IS IT MEM ERROR OR RESTART
        BIT     WARMST,A
        JR      Z,NMIF           RESTART IS ZERO
        DEC     H
        JR      NZ,NMI0
        LD      HL,(TESTIND)     GO TO TEST ROM ?
        LD      A,INDIC
        CP      H
```

```
          JR      NZ,NMNTEST
          CP      L
          JP      Z,TESTAD
NMNTEST   IN      A,(MEMERC)     TURN ON ERROR LIGHT
          IN      A,(MEALO)
          LD      L,A
          IN      A,(MEAHI)
          LD      H,A
          LD      A,(HL)
          LD      (HL),A         READ CORRECTED BIT AND WRITE IT BACK (SOFT ERROR)
          LD      (MERAOR),HL
          LD      HL,ERRINT
          SET     0,(HL)
NMTME     POP     HL
          POP     AF
          RETN
NMTF      LD      HL,SWRMI       RAM WARM RESTART ?
          LD      A,INDIC
          CP      (HL)
          JP      NZ,NMI1
          INC     HL
          CP      (HL)
          JP      Z,WARMR        IT IS
NMI1      LD      HL,FWRMI       ROM WARM RESTART ?
CLOSEL    EQU     55H            CLOSE LINK REQUEST CHAR
STCHR     EQU     5EH            START CHAR OF PROTOCOL
*         DEVICE SERVICE BLOCK DEFINES (DSB)
DSBSTA    EQU     0              DSB STATUS

DEVICE    EQU     1              DSB DEVICE
DSBCOM    EQU     2              DSB COMMAND
DEVSTA    EQU     3              DSB DEVICE STATUS OR COMMAND
OBDPTR    EQU     4              DSB OUTPUT BUFFER DESCRIPTOR POINTER
INBUFA    EQU     6              DSB INPUT BUFFER POINTER
INBUFL    EQU     8              DSB INPUT BUFFER LENGTH
INRECL    EQU     10             DSB INPUT RECORD LENGTH RECEIVED
INTADR    EQU     12             DSB INTERRUPT ADDRESS POINTER
DSBLNK    EQU     14             DSB LINKED LIST POINTER
DSBNAK    EQU     3              NAKS FOR RECEIVING IN DSB
*         BIT NAMES FOR BITS IN DSBSTA
DOEND     EQU     7              DEVICE END IN RDRES
DDONE     EQU     7              DSB COMMAND COMPLETED OR FAILED
DPI       EQU     6              DSB COMMAND SENT, AWAITING COMPLETION
DBUSY     EQU     5              BUSY RESPONSE FROM DEVICE
DBADD     EQU     4              CHECK CHARS FAILED IN LAST INPUT MESSAGE
DTIM      EQU     3              TIMEOUT1 OCCURED AFTER LAST TRANSMISSION
DNAK      EQU     2              NAK RECEIVED AFTER LAST MESSAGE
DPUP      EQU     1              DEVICE POWERED UP AFTER COMMAND
DACK      EQU     0              ACK RECEIVED AFTER LAST MESSAGE
*         BIT NAMES FOR BITS IN IOCTL (SEE MEMORY ALLOCATION)
TIMCHK    EQU     7              AT GAP INT. INDICATES TIMEOUT1
GAPCK     EQU     6              AT GAP INT. INDICATES A GAP IN PROTOCOL
UNKREC    EQU     5              INDICATES INPUT ON UNKNOWN DSB (DSBX LIST)
RECSET    EQU     4              AT FIRST CHAR INDICATES A PROTOCOL GAP HAS PASSED
BRKLNK    EQU     3              USED TO BREAK LINK
PEDLNK    EQU     2              SUB LINK
ERRLCK    EQU     1              MEMORY ERROR INTERRUPT LOCKOUT
FCHREN    EQU     0              ENABLE UART INT. INDICATING FIRST CHAR INT
*         MEMORY  ALLOCATION
          ORG     8000H
DEVTAB    DS      256            ACTIVE DEVICE LIST
DSBX      DS      2              DSB POINTER FOR UNDEFINED INPUTS
IOCTL     DS      1              CONTROL OF GAP INT. AND LINK
SNDDSB    DS      2              ADDRESS OF NEXT DSB TO SEND OR CURRENT DSB THAT
                                 ; RESPONSE IS DUE ON BY TIMEOUT1
*         NAKS,NXTDSB AND LSTDSB MUST BE IN THIS ORDER
NAKS      DS      1              ; USED TO KEEP TRACK OF NUMBER OF NAKS IN MESSAGE
NXTDSB    DS      2              ; POINTER TO NEXT DSB TO TRANSMIT
LSTDSB    DS      2              ; TAIL POINTER TO CURRENT LAST DSB TO TRANSMIT
NBLK      DS      1              ; NUMBER OF BLOCKS ON DISK (256 MAX = 65K PROG)
TEMP      DS      5              ; TEMPORARY USED IN VARIOUS PLACES
```

```
INTLSW   DS      1           ; NUL INTERRUPT STATUS BYTE
                             ; BIT 0 IS INTERRUPT PENDING
                             ; BIT 1 IS INTERRUPT ENABLE
INTHEAD  DS      2           ; HEAD POINTER FOR DSB INTERRUPT LIST
INTAIL   DS      2           ; TAIL POINTER FOR DSB INTERRUPT LIST
ERRINT   DS      1           INDICATOR FOR INTERRUPT THAT MEM ERR OCCURED
DATAPC   DEFL    $
STACK    EQU     MERADR
*
*
*        PROGRAM         CODE
*
CODEPC   DEFL    0
         ORG     CODEPC
         JP      START
         JP      SVC0TU          USED FOR EXTERNAL ROUTINES TO CALL SVC0
         DW      TIMESS
         TITLE   'ALIVE MASTER I/O INTERFACE   V2.6
         LIST    Z
         NLIST   R
*        ALINE Z80 MAJOR USED WITH LINKLESS PROTOCOL.
*        AUTHOR          JOE KUBLER
*        WRITTEN         SEPT. 19,1979
*        MAY 29,1980     FIX INTERRUPTS
*
*        V2.0
*        V2.1            6/06/80.    ADD POWER UP RESET COMMAND AND BUSY RETRY LIMIT
*        V2.2            9/08/80     ADD WARM RESTART CAPABILITY
*        V2.3            11/13/80    ADD SVC2,CHANGE COLD AND WARM RESTART,
*                                    ADD NATIVE CODE TPI.
*        V2.4            12/01/80    ADD RAM ADDRESSABILITY TEST. THIS TEST
*                                    WILL ALSO DO A RUDIMENTERY RAM TEST.
*        V2.5            3/20/81     CHANGE MEMORY ERROR CODE TO ALLOW EASY
*                                    TEST OF BOARDS. ALSO CHANGE MEMORY TEST
*                                    TO 'STATIC' TYPE TEST
*        V2.6            4/23/81     ADD TO POWER UP MESSAGE FOR DEBUGGER
*
*        DEFINES
*                LINKAGES TO INTERPRETER AND DEBUGGER
ZINT     EQU     1003H
ZBUGINT  EQU     1000H
TESTIND  EQU     3003H       INDICATOR TO MEMMORY ERROR CODE THAT TEST ROMS LOADED
TESTAD   EQU     3005H       ADDRESS OF TEST CODE
*
INDIC    EQU     55H         INDICATOR VALUE FOR RESTARTS ETC
FCLDI    EQU     2000H       ADDRESS OF DATA PATTERN TO CONFIRM NUL ROM
FCLDV    EQU     2002H       VECTOR OF FIRMWARE NULL CODE TO EXECUTE
FWRMI    EQU     2004H       ADDRESS OF POSSIBLE NUL WARM START CODE
FWRMV    EQU     2006H       VECTOR OF FIRMWARE NULL TO EXECUTE FOR WARM START
MERADR   EQU     81F8H       MEMORY ERROR ADDRESS SAVE LOCATION
MERV     EQU     MERADR+2    VECTOR OF NUL CODE FOR MEMORY ERROR HANDLER
SWRMI    EQU     MERV+2      ADDRESS OF DATA PATTERN TO CONFIRM RAM WARM START
SWRMV    EQU     SWRMI+2     VECTOR OF NUL CODE TO EXEC FOR RAM WARM START
*
DVRADR   EQU     7EH         ADDRESS INDICATING SENDING DEVICE POWERED UP
*
LNKCTL   EQU     0           LINK CONTROL
LINKST   EQU     0           LINK STATUS
LINK     EQU     1           LINK UART PORT
RESGAP   EQU     2           RESET GAP AFTER INTERRUPT
ALNADR   EQU     2           ALINE ADDRESS OF THIS DEVICE
NMISTA   EQU     0           NON-MASKABLE INT STATUS BYTE TO INDICATE WARMRESTART
MEMERC   EQU     3           TURN ON MEMORY ERROR LIGHT
MEALO    EQU     4           ADDRESS OF MEM ERROR LOW BYTE
MEAHI    EQU     5           MEMORY ERROR ADDRESS HIGH BYTE
WARMST   EQU     5           INDICATOR IN NMISTA OF WARM START VS MEMORY ERROR
WARMDB   EQU     1000        DEBOUNCE TIME FOR WARM RETART BUTTON
LNKIRD   EQU     8           LINK INPUT READY STATUS MASK
LNKORD   EQU     10H         LINK OUTPUT READY STATUS MASK
TIMODLY  EQU     24          TIMEOUT 0 VALUE .4 MSEC
CHRDLY   EQU     7           TIMEOUT FOR 1 CHAR ON LINK .15 MSEC
MAXNAK   EQU     255         MAXIMUM NAKS ALLOWED FOR A MESSAGE
```

```
ACKCHR  EQU  78H  VALUE OF ACK CHAR IN PROTOCOL
NAKCHR  EQU  19H   "     "  NAK   "    "
ENDCHR  EQU  55H   "     "  END   "    "
BSYCHR  EQU  2CH   "     "  BUSY  "    "
```

It will be apparent that many modifications and variations may be effected without departing from the scope of the novel concepts and teachings of the present invention.

What is claimed is:

1. In a closed loop data processing network,
 (a) a series of nodes having data processing units associated therewith each having a data input and a data output, and requiring at least one processing step in transmitting data between its data input and its data output, said nodes being selectively operable for sending a bid message seeking control of communication,
 (b) a series of communication links coupling the nodes in a loop communications path for enabling data communication therebetween, and including an incoming link path and an outgoing link path at each node,
 (c) transmission link switches at the respective nodes each having a first transmission mode and a second cutoff mode,
 (d) each transmission link switch in said first transmission mode providing a switch path directly coupling the incoming and outgoing link paths at the respective associated node so as to provide for undelayed date transmission independent of the data processing unit associated with the node,
 (e) each transmission link switch in said cutoff mode serving to interrupt said switch path such that the incoming and outgoing link paths at the respective associated node are not coupled via said switch path but are only coupled via the data input and the data output of the associated data processing unit, and
 (f) control means associated with each data processing unit for placing the associated transmission link switch is cutoff mode during the transmission of a data message from the data processing unit, while assuring against a communications gap of a predetermined time duration during reception of a response to the transmitted data message,
 (g) said control means associated with each data processing means being free of a common timing control common to said series of nodes and whenever ready to initiate communication with any other node being operable in response to a communications gap of the predetermined time duration occurring at any time to immediately place the associated transmission link switch in the cutoff mode in preparation for sending a bid message over the same communication path as data messages are transmitted.

2. A closed loop data processing network according to claim 1, with said data input of each data processing unit having means for monitoring to detect a communications gap of a predetermined time duration during which there is an absence of data transmission along the associated switch path.

3. A closed loop data processing network according to claim 2, with said control means of each data processing unit when having a data message to transmit, being responsive to detection of a communications gap of a predetermined time duration to shift the associated transmission link switch to cutoff mode, and to transmit a bid message for seeking control of communication via the loop communications path.

4. A closed loop data processing network according to claim 3, with said control means of a data processing unit after having made a successful bid and having sent its data message, being operable upon receipt of a first part of a response to its data message to shift its transmission link switch to transmission mode, and being operable upon receipt of a further part of a response to shift its transmission link switch to cutoff mode so as to interrupt further signal propagation via the switch path.

5. A closed loop data processing network according to claim 2, with each data processing unit having an assigned address and said control means thereof being operable in response to receipt of a data message with its assigned address to shift its transmission link switch to cutoff mode, to transmit a response, and to execute a time delay sufficient to ensure that the data processing unit sending the data message has time to determine that a response is being sent, before shifting the transmission link switch at the addressed data processing unit to the transmission mode.

6. A closed loop data processing network according to claim 1, with said control means of said date processing units being operable to recognize data messages directed thereto from other units and to respond thereto, each of the control means of said data processing units being operable in response to a data message directed thereto to shift the associated transmission link switch to cutoff mode, send the response, and execute a time delay of sufficient duration to prevent the response from traversing the loop communications path more than once.

7. In a cloaed loop data processing network,
 (a) a series of nodes having data processing units associated therewith each having a data input and a data output, and requiring at least one processing step in transmitting data between its data input and its data output,
 said nodes being operable selectively as bidding nodes during a bidding operation for sending bid messages for seeking control of the loop communications path,
 (b) a series oi communication links coupling the nodes in a loop communications path for enabling data communication therebetween, and including an incoming link path and an outgoing link path at each node, coupled with the data input and the data output of the associated data processing unit, respectively,
 (c) transmission link switches at the respective nodes each having a first transmission mode and a second cutoff mode,
 (e) each transmission link switch in said first transmission mode providing a switch path directly coupling the incoming and outgoing link paths at the respective associated node so as to provide for undelayed data transmission independent of the data processing unit associated with the node,
 (e) each transmission link switch in said cutoff mode serving to interrupt said switch path such that the incoming and outgoing link paths at the respective associated node are not coupled via said switch path but are only coupled via the data input and the data output of the associated data processing unit, and
 (f) each transmission link switch being placed in cutoff mode during predetermined operations of the data processing unit so as to insure that data messages only tranverse the loop communications path once, and (g) control means controlling said transmission link switches during a bidding operation in the transmission of bid messages from respective bidding nodes seeking control of the loop communications path for the transmission of desired information, and for controlling said transmission link switches for the transmission of the desired information from a node which is successful in the bidding operation to any desired recipient node without any processing step delay.

8. A closed loop data processing network according to claim 7, with logic means at each node forming the transmission link switch therefor and being controlled by the associated data processing unit so as to place the logic means in a blocking mode to interrupt the associated switch path when the data processing unit is operating as a bidding node and transmitting a message, and when the data processing unit is acting as a recipient node and is transmitting a response.

9. A closed loop data processing network according to claim 8, with time delay means for delaying shifting of a logic means to a nonblocking node after a response has been transmitted for a time interval sufficient to effect the blocking of the response from a second transverse of the loop path.

10. A closed loop data processing network according to claim 8, with further logic means at each node having a first input connected to the output of said first mentioned logic means and having a second input connected with the data output of the data processing unit at the node, the shifting of the first mentioned logic means to blocking mode causing the supply of an enabling signal from the output of the first mentioned logic means to the first input of the further logic means, thereby enabling said further logic means to transmit a data message from the data processing unit via the second input of said further logic means, the output of said further logic means being connected with the outgoing link path of the node.

11. A closed loop data processing network according to claim 7, with a first logic element at each node forming the transmission link switch therefor, a second logic element at each node having a first input connected to the output of said first logic element and having a second input connected with the data output of the data processing unit at the node, the shifting of the first logic element to cutoff mode causing the supply of an enabling signal from the output of the first logic element to the first input of the second logic element, thereby enabling said second logic element to transmit a data message from the data processing unit via the second input of said second logic element, the output of said second logic element being connected with the outgoing link path of the node.

* * * * *